US006578077B1

(12) United States Patent
Rakoshitz et al.

(10) Patent No.: US 6,578,077 B1
(45) Date of Patent: *Jun. 10, 2003

(54) TRAFFIC MONITORING TOOL FOR BANDWIDTH MANAGEMENT

(75) Inventors: Gregory Rakoshitz, Palo Alto, CA (US); Aseem Vaid, San Jose, CA (US); Atul Pandit, Campbell, CA (US); Sanjeev Putta, Campbell, CA (US)

(73) Assignee: Novell, Inc., Provo, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,517

(22) Filed: Dec. 29, 1997

Related U.S. Application Data

(60) Provisional application No. 60/067,857, filed on Dec. 5, 1997, and provisional application No. 60/047,752, filed on May 27, 1997.

(51) Int. Cl.[7] .......................... G06F 15/177; G06F 17/40
(52) U.S. Cl. ........................ 709/224; 709/226; 345/735; 345/736
(58) Field of Search .......................... 370/252; 345/440, 345/326, 329, 733, 734, 735, 736, 737, 738, 739, 740; 709/224, 226

(56) References Cited

U.S. PATENT DOCUMENTS

| 5,365,514 A | | 11/1994 | Hershey et al. | |
|---|---|---|---|---|
| 5,446,874 A | * | 8/1995 | Waclawsky et al. | ............ 714/1 |
| 5,493,689 A | | 2/1996 | Waclawsky et al. | |
| 5,519,689 A | * | 5/1996 | Kim | ............................ 370/232 |
| 5,521,907 A | * | 5/1996 | Ennis, Jr. et al. | ............ 370/253 |
| 5,583,792 A | * | 12/1996 | Li et al. | ....................... 709/224 |
| 5,615,323 A | * | 3/1997 | Engel et al. | ................. 345/440 |
| 5,664,105 A | * | 9/1997 | Keisling et al. | ............... 714/39 |
| 5,867,483 A | * | 2/1999 | Ennis, Jr. et al. | ............ 370/252 |
| 6,097,722 A | * | 8/2000 | Graham et al. | ............. 370/395 |

FOREIGN PATENT DOCUMENTS

EP 0 460 843 A2 11/1991

OTHER PUBLICATIONS

Gaspoz J. P. "Applying an object–oriented method to design a VPN bandwidth management system," Annales des Telecommunication; (Paris), 1995, Swiss Federal Institue of Techonology, EPFL Telecommunication Laboratory.*

Jander M, Beyond RMON: Making Sense of Remote Data, Data Communications, Jun. 1, 1992, pp. 51–52, vol. 21, No. 9, McGraw–Hill, New York, US.

Supplementary European Search Report for application No. EP 98 96 6473, Oct. 31, 2001.

International Search Report for International Application No. PCT/US98/27396, May 26, 1999.

* cited by examiner

Primary Examiner—Dung C. Dinh
(74) Attorney, Agent, or Firm—Schwegman, Lundberg, Woessner & Kluth, P.A.

(57) ABSTRACT

A method and system (100) for monitoring or profiling quality of service within a network of computers. The method includes a step of providing a network of computers, each being coupled to each other to form a local area network. The network of computers has a firewall server (110) coupled to the network of computers and a traffic management tool coupled to the firewall server. The method also includes implementing traffic monitoring or profiling of incoming and outgoing information.

62 Claims, 15 Drawing Sheets

TRAFFIC MONITORING TOOL FOR BANDWIDTH MANAGEMENT

RELATED APPLICATIONS

This present application claims priority to U.S. Ser. No. 60/067,857 filed Dec. 5, 1997, and U.S. Ser. No. 60/047,752 filed May 27, 1997, which are both hereby incorporated by reference for all purposes.

BACKGROUND OF THE INVENTION

The present invention relates to communication or telecommunication. More particularly, the present invention provides a technique, including a method and system, for monitoring and allocating bandwidth on a telecommunication network at, for example, a firewall access point. As merely an example, the present invention is implemented on a wide area network of computers or workstations such as the Internet. But it would be recognized that the present invention has a much broader range of applicability including local area networks, a combination of wide and local area networks, and the like.

Telecommunication techniques have been around for numerous years. In the early days, people such as the American Indians communicated to each other over long distances using "smoke signals". Smoke signals were generally used to transfer visual information from one geographical location to be observed at another geographical location. Since smoke signals could only be seen over a limited range of geographical distances, they were soon replaced by a communication technique known as telegraph. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network. These computers or workstations coupled to each other can transmit many types of information from one geographical location to another geographical location. This information can be in the form of voice, video, and data, which have been commonly termed as "multimedia." Information transmitted over the Internet or Internet "traffic" has increased dramatically in recent years. In fact, the increased traffic has caused congestion, which leads to problems in responsiveness and throughput. This congestion is similar to the congestion of automobiles on a freeway, such as those in Silicon Valley from the recent "boom" in high technology companies, including companies specializing in telecommunication. As a result, individual users, businesses, and others have been spending more time waiting for information, and less time on productive activities. For example, a typical user of the Internet may spend a great deal of time attempting to view selected sites, which are commonly referred to as "Websites," on the Internet. Additionally, information being sent from one site to another through electronic mail, which is termed "e-mail," may not reach its destination in a timely or adequate manner. In effect, quality of service or Quality of Service ("QoS") of the Internet has decreased to the point where some messages are being read at some time significantly beyond the time the messages were sent.

Quality of Service is often measured by responsiveness, including the amount of time spent waiting for images, texts, and other data to be transferred, and by throughput of data across the Internet, and the like. Other aspects may be application specific, for example, jitter, quality of playback, quality of data transferred across the Internet, and the like. Three main sources of data latency include: the lack of bandwidth at the user (or receiving) end, the general congestion of Internet, and the lack of bandwidth at the source (or sending) end.

A solution to decreasing data latency includes increasing the bandwidth of the user. This is typically accomplished by upgrading the network link, for example by upgrading a modem or network connection. For example, the network link may be upgraded to X2 modems, 56K modems, ADSL or DMT modems, ISDN service and modems, cable TV service and modems, and the like. Drawbacks to these solutions include that they typically require additional network service; they also require additional hardware and/or software, and further they require both the sender and receiver to both agree on using the same hardware and/or software. Although one user may have a much faster line or faster modem, another user may still rely on the same 1,200 kb modem. So, the speed at which information moves from one location to another location is often determined by the slowest information, which is being transferred over the network. Accordingly, users of faster technology are basically going nowhere, or "running" nowhere fast, as is commonly stated in the network industry.

From the above, it is seen that a technique for improving the use of a wide area network is highly desirable.

SUMMARY OF THE INVENTION

The present invention relates to a technique, including a method and system, for providing more quality to telecommunication services. More particularly, the present invention relates to quality of service management using a novel traffic monitoring technique. The present monitoring technique is predominantly software based, but is not limited to such software in some embodiments.

In a specific embodiment, the present invention provides a system with a novel graphical user interface for monitoring a flow of information coupled to a network of computers. The user interface is provided on a display. The display has at least a first portion and a second portion, where the first portion displays a graphical chart representing the flow of information. The second portion displays text information describing aspects of the flow of information. The combination of the first portion and the second portion describe the information being profiled.

In an alternative specific embodiment, the present invention provides a novel computer network system having a real-time bandwidth-profiling tool. The real-time bandwidth-profiling tool has a graphical user interface on a monitor. The graphical user interface includes at least a first portion and a second portion. The first portion displays a graphical chart representing the flow of information. The second portion displays text information describing the flow of information. The combination of the first portion and the second portion describe the information being profiled.

In still an alternative embodiment, the present invention provides a novel bandwidth-profiling tool. The present bandwidth profiling tool includes a variety of computer codes to form computer software or a computer program, which is stored in computer memory. The program includes a first code that is directed to measuring a data rate for a flow of information from an incoming source, which is coupled to a network of computers. The program also has a second code that is directed to categorizing the data rate from the flow of information based upon at least one of a plurality of traffic classes and a third code that is directed to outputting a visual representation of the data rate in graphical form on a display. A fourth code is used to direct the outputting of a text representation of the one of the plurality of traffic classes on the display. The present invention has a variety of other codes to perform the methods described herein, and outside the present specification.

Numerous advantages are achieved by way of the present invention over pre-existing or conventional techniques. In a specific embodiment, the present invention provides a single point or a single region to manage telecommunication traffic including directory services and bandwidth management. Additionally, in some, if not all embodiments, the present invention can be implemented at a single point of access such as a computer terminal or firewall, for example. Furthermore, the present invention can be predominately software based and can be implemented into a pre-existing system by way of a relatively simple installation process. Moreover, the present invention provides more valued applications and users with a more reliable and faster service. Less critical applications and users are provided with a service level that is appropriate for them in some embodiments. In most embodiments, available bandwidth in a system is fairly shared between equally prioritized users (e.g., no user can monopolize or "hog" the system). Still further, link efficiency improves due to overall congestion avoidance in most cases. Moreover, the present invention implements its traffic management technique using a simple and easy to use "rule" based technique.

Further understanding of the nature and advantages of the invention may be realized by reference to the remaining portions of the specification, drawings, and attached documents.

DESCRIPTION OF SPECIFIC EMBODIMENTS

Figure 1:
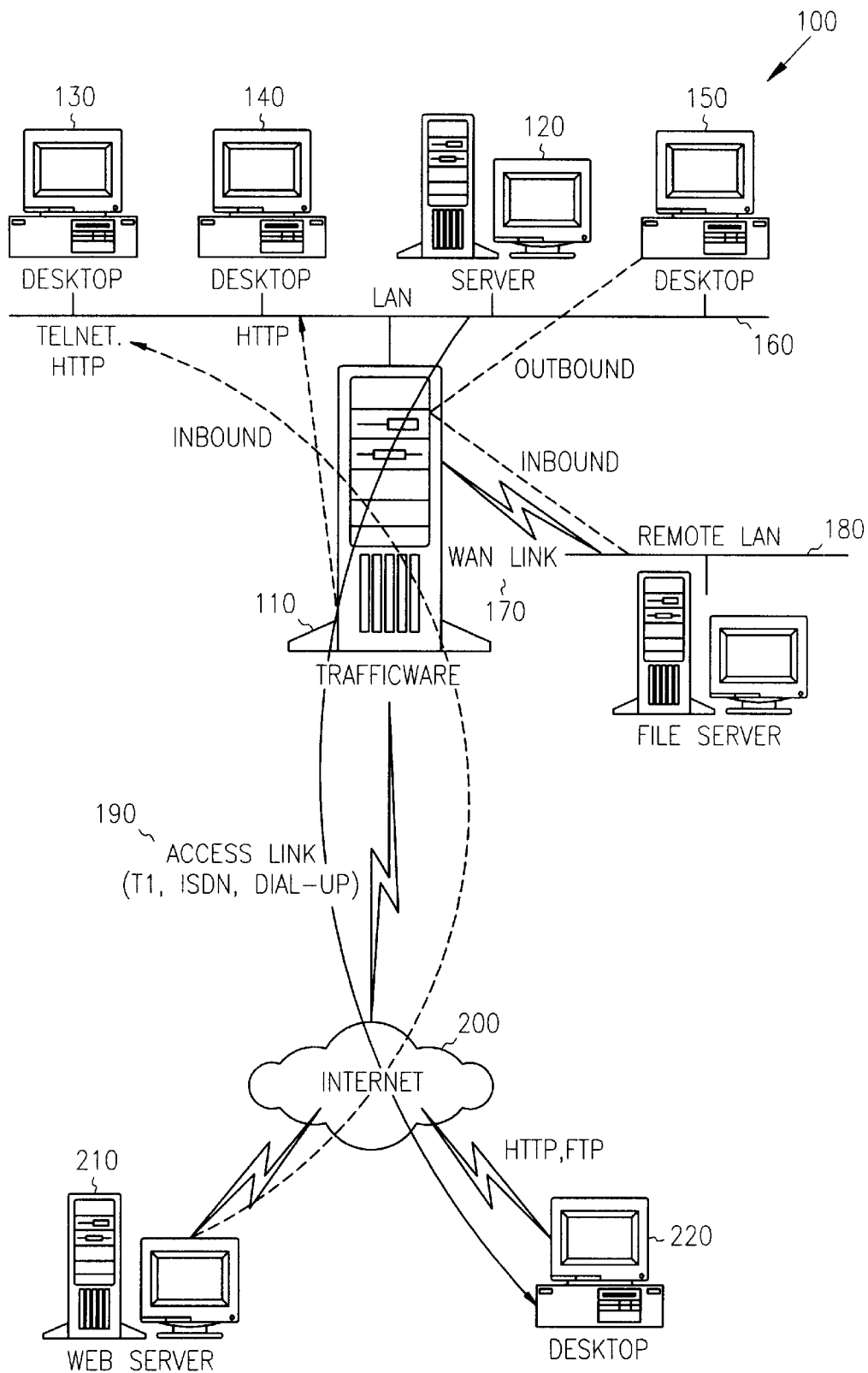
FIG. 1 is a simplified diagram of a system according to an embodiment of the present invention.

An embodiment of the present invention provides integrated network service policies for firewall platforms, as well as other platforms or gateways. Specifically, the present invention provides network or firewall administrators with the ability to implement policy-based schema for security and resource management on firewall platforms. In a specific embodiment, resource management includes Network Quality of Service (QoS) or "bandwidth" management techniques. In an exemplary embodiment, the present invention provides tools for monitoring traffic for bandwidth management, as well as other functions.

Network QoS occurs by managing the resources that serve network application traffic, for example. This typically includes the following resources: link bandwidth, application server bandwidth (CPU), and buffer space on generally all nodes (end-points, routers and gateways). Typically, data through-put is limited by the speed of Internet access links and by the server CPU capacity, and response time is determined by the number of hops in a route, physical length of the route, and extent of congestion in the route. There are various other factors that may affect QoS, such as the behavior of TCP/IP, severe congestion anywhere in the route, prioritization of traffic along the route, etc. To a network administrator, embodiments of the present invention provide discrimination of different traffic types and provide methods for enforcement of traffic flow by management to the above resources.

Definitions

In the present invention, it may assist the reader to understand some of the terms described herein. These terms have been briefly described below. These terms are merely examples and should not unduly limit the scope of the claims herein.

1. Traffic Management: A set of techniques or mechanisms including policies that can be applied in a network to manage limited network resources such as bandwidth and the like. These techniques are intended to improve overall network performance and efficiency. They are also intended to provide for more predictability and orderliness in the event of network congestion. The techniques should also isolate faults and provide visibility into performance problems. Additionally, they should meet the diverse user and application requirements as per an organization's business goals. Furthermore, traffic management is intended to increase the "good put" traffic, based on the economic value and prevent the abuse of network resources.

2. Quality Of Service (QoS): The concept of Quality of Service (QoS) has been analyzed and discussed for a number of years in the networking industry, and was previously associated mostly with ATM technology. In a more generic sense, QoS describes the performance specifications that an application requires from the underlying infrastructure. Otherwise, the application will not run satisfactorily. Some applications are designed to run in a best-effort mode and can adapt to available bandwidth. Others are extremely sensitive to delays. Still others can produce large bursts in traffic, which affects other applications while providing little perceptible improvements to the end-user. QoS specifications are closely associated with the expectations and perceptions of end-users and the organization they are part of.

3. Bandwidth: Bandwidth usually refers to maximum available bit rate for a specific application. In a specific embodiment, synchronous, interactive, and real-time applications, which are bandwidth-sensitive, can require minimum bandwidth guarantees, and can require sustained and burst-scale bit-rates. On the other hand, network administrators may want to limit bandwidth taken by non-productive traffic such as push technologies like PointCast and others. Even though bandwidth may be allocated for specified applications, it does not mean that these applications may be using that bandwidth. Therefore, a good policy should be to enforce when there is competition and demand.

4. Latency: Latency generally refers to the delay experienced by a packet from the source to destination. Latency requirements are typically specified as mean-delay and worst case delay in some cases. Real-time audio/video applications such as, for example, DNS, HTTP, and TELNET are delay sensitive. Delay is a result of propagation delay, due to physical medium and queuing at intermediate nodes such as routers, gateways, or even servers. A certain portion of the delay can be controlled by how the queues are serviced at the intermediate nodes, and by controlling congestion at bottleneck points. Some examples of delay measures are packet round-trip delay and connection response time.

5. Jitter: Jitter generally refers to variation in delay (e.g., that is, the delay is not constant for all packets of a given flow) for a particular application. Real-time applications require a worst case jitter. Applications such as real-audio and video do some advanced buffering to overcome any variation in packet delays—the amount of buffering is determined by the expected jitter.

6. Packet Loss: Packet loss is a loss in a packet or a portion of packets that is generally caused by failure of network elements (e.g., routers, servers) to forward or deliver packets. Packet loss is usually an indication of severe congestion, overload of an element, or element failure (e.g., if a server is down). Even if the packet was not dropped but just delayed, protocols and applications can assume it was lost. Packet loss can cause application timeouts, loss of quality or retransmitted packets. Packet loss is usually specified as a rate (e.g., a real-time video application cannot tolerate loss of more than one packet for every 10 packets sent). Indirect results of packet loss may also be measured (e.g., connection retries or data retransmits).

7. Guarantees: An extreme example of a guarantee is to partition bandwidth so that it is not available to other entities. Guarantee also means a share of the resource, e.g., minimum bandwidth or maximum latency.

8. Best-effort: Best-efforts describes a Service on best-effort basis but makes no guarantees.

9. Limits: Specific physical or theoretical limitation on a resource such as bandwidth. Resource utilization or admission is limited under certain conditions.

10. Priority: Level of importance for a specific user, application, or data. Create a priority scheme among different entities so that contention is resolved or service is provided.

11. Traffic Profiling: Profiling is intended to be defined as cumulative details of traffic flows for each active client, server, or application without application of any rules. This includes bandwidth, response time, and failure-related statistics. Profiling is intended to provide long term cumulative snapshots of traffic for capacity planning or setting traffic rules.

The above definitions are merely intended to assist the reader in understanding some of the terms described herein. They are not intended, in any manner, to limit the scope of the claims. One of ordinary skill in the art would recognize other variations, modifications, and alternatives.

System Overview

FIG. 1 illustrates a simplified system 100 according to an embodiment of the present invention. The system 100 is merely an illustration and should not limit the scope of the claims herein. One of ordinary skill in the art would recognize other variations, modifications, and alternatives. The present invention can be embodied as a TrafficWare™ firewall server 110 from Ukiah Software, Inc, but can be others. System 100 typically includes a file server 120, and a plurality of computers 130–150, coupled to a local area network (LAN) 160, and other elements. Firewall server 110 includes a typical connection to a wide area network (WAN) 170 and to a remote LAN 180 (such as an Intranet) and a typical network connection 190 to the Internet 200. Attached to Internet 200 are Web servers 210 and other computers 220.

As illustrated, computers such as computer 130, 140, and 210 communicate using any one or multiple application layer protocols such as Telnet, file transfer protocol (FTF), Hypertext transmission protocol (HTTF), and the like. Further, communication across WAN 170 and across network connection 190 implements transport layer protocols such as transmission control protocol (TCF), universal data protocol (UDF), and the like. LAN 160 and LAN 180 are preferably based upon network protocols such as Internet protocol (IP), IFX from Novell, AppleTalk, and the like. As shown in FIG. 1, network connection 190 may be accomplished using TI, ISDN, Dial-up, and other hardware connections. Computers 120–150 and 210–220 may be any suitable make or model of computer that can be coupled to a network. The system can also include a variety of other elements such as bridges, routers, and the like.

In an alternative specific embodiment, the present invention may be applied to a system with various links accessed in servicing a browser request at a remote web server. In this embodiment, a client could be dialing in via a 28.8 kbit dial up modem to a local Internet service provider (ISP), where the ISP may be connected to the Internet by a T1 link. A web server may be on a 10 Mbs Ethernet LAN, which is connected to another ISP via a 56 K frame relay. The web server's ISP may be connected to its carrier via a T3 line. The client ISP carrier and the server ISF carrier may both be connected by an ATM backbone or the like. Because of this asymmetry in this embodiment, any traffic management solution should take into account these variations including traffic speed and data format described above. Moreover, simply upgrading the capacity of a link, in the access path, may not offer a viable solution. This present embodiment may have the bandwidth requirements shown by way of Table 1, for example.

TABLE 1

Bandwidth Requirements

| Users | Bandwidth | Service Offered |
|---|---|---|
| Internet developers, individuals, international locations where bandwidth is expensive | 28.8 to 56 Kbps | Dial-up services, ISDN |
| Small to medium-sized organizations with moderate Internet usage | 56 Kbps to 1.5 Mbps | Fractional TI, frame relay |
| Medium sized organizations with many moderate users, smaller organizations requiring huge amounts of bandwidth | 1.5 Mbps | Dedicated TI circuit |
| Standard bandwidth for Ethernet-based LANS | 10 Mbps | Ethernet, token ring (4 Mbps or 16 Mbps) |
| Bandwidth usage for | 45 Mbps | Dedicated T3 Circuit |

TABLE 1-continued

Bandwidth Requirements

| Users | Bandwidth | Service Offered |
| --- | --- | --- |
| large organizations or Internet backbones Huge bandwidth LAN backbone usage for medium to large organizations (hundreds of thousands of users) | 100 to 1.000 Mbps | Fast Ethernet, gigabit Ethernet |

As shown above, there exist a large number of diverse applications and protocols that are widely used and have their own performance requirements. For example, applications such as mail (e.g. SMTP) and news (e.g., NNTP) are not interactive and are therefore not sensitive to delay. On the other hand, applications such as real-time conferencing are extremely sensitive to delay but not to packet loss. Applications such as TELNET and DNS do not utilize significant bandwidth, but are sensitive to delay and loss. Conversely, applications such as FTP consume a great deal of bandwidth but are not that sensitive to delay. Generally, network applications can be categorized as:

1. Interactive (e.g., delay sensitive) versus non-interactive (e.g., delay tolerant);
2. Bandwidth intensive (bulk data) versus non-bandwidth intensive; and
3. Bursty versus non-bursty.

These categories are merely illustrative and should not limit the scope of the claims herein. Additionally, some application requirements are dependent on the context of use and the nature of data being accessed. Such applications can be described as being nominally interactive or nominally bandwidth intense. This means the description applies to many but not all the situations in which they are used.

As merely an example, Table 2 provides some illustrations for these categories.

TABLE 2

Application Spectrum

| Application Class | Examples |
| --- | --- |
| Low-bandwidth, delay sensitive, highly interactive | DNS, PING, TELNET, CHAT, COLLABORATION |
| High bandwidth, delay sensitive | Real-time audio and video |
| High Bandwidth, nominally interactive | Web service requests, file downloads |
| Non-interactive | Mail and news |

As shown in Table 2, low-bandwidth, delay sensitive, and highly interactive applications include, among others, DNS. PING, TELNET, CHAT, COLLABORATION. High bandwidth and delay sensitive applications including at least real-time audio and video. Additional applications for high bandwidth and nominally interactive, or non-interactive have also been shown. Again, these applications are merely provided for illustration and should not limit the scope of the claims herein.

The present invention can also be used with a number of various files. For example, a number of common applications, such as FTP and HTTP, can handle a wide variety of files. The file types being transferred and downloaded place different demands on the underlying infrastructure. Index and HTML files take up limited bandwidth but have very mundane contents. On the other hand, GIF, JPEG and MPEG, RA and A VI files take up a lot more bandwidth but provide a rich multimedia experience to the end-user. In fact, push technologies such as PointCast basically download rich-multimedia bandwidth-intensive files.

The present invention can also be used with a variety of user requirements. For example, networks are facing an explosion in the number of (inter) networked applications and data accessible through them. Network resources are increasingly being used for a wide variety of purposes, ranging from business critical to personal. This means that policies must ensure that scarce resources (e.g., Internet bandwidth) are utilized with the goal of maximizing the returns to the organization. These benefits can come from direct revenue generating activities or from improved productivity (or reduced loss of productivity). As shown in Table 3, for example, at a mythical company called "Shebang Software Inc." the highest bandwidth priority has been allocated to technical support. However, there is no hard and fast rule. As with security policies. decisions should be consistent with the needs of the organization.

TABLE 3

Shebang Software User Priorities

| Users | Application Class | Reasons |
| --- | --- | --- |
| Technical support | Mission critical | Needs most bandwidth to deal with customers who need assistance |
| Sales and marketing | Critical | Needs bandwidth to deal with potential customers. Answer inquires, make quotes transmit multimedia presentations. |
| Upper management and middle management, administrative | Casual | Needs bandwidth to perform tasks necessary to run the business |
| Development and manufacturing | Personal | Needs bandwidth to send e-mail, subscribe to Push technologies |

The present invention takes into account, in one or more embodiments, the factors which are described specifically above. Although the above has been generally described in terms of a specific type of information, other types of information on a network can also be used with the present invention. Additionally, the present invention has been described in general to a specific system. For instance, the present bandwidth management tool can be applied at a network's Internet access link. Alternatively, the present tool can be applied to a private W AN link to a remote corporate site or an access to a server farm (e.g., a group of servers located in a special part of the network close to an access link, e.g., in a web hosting environment). Alternatively, the present invention can be applied to key servers (e.g., database/web server) within an organization servicing internal and/or external users. Furthermore, the present bandwidth management tool can be applied to any combination of the above or the like.

Figure 2:
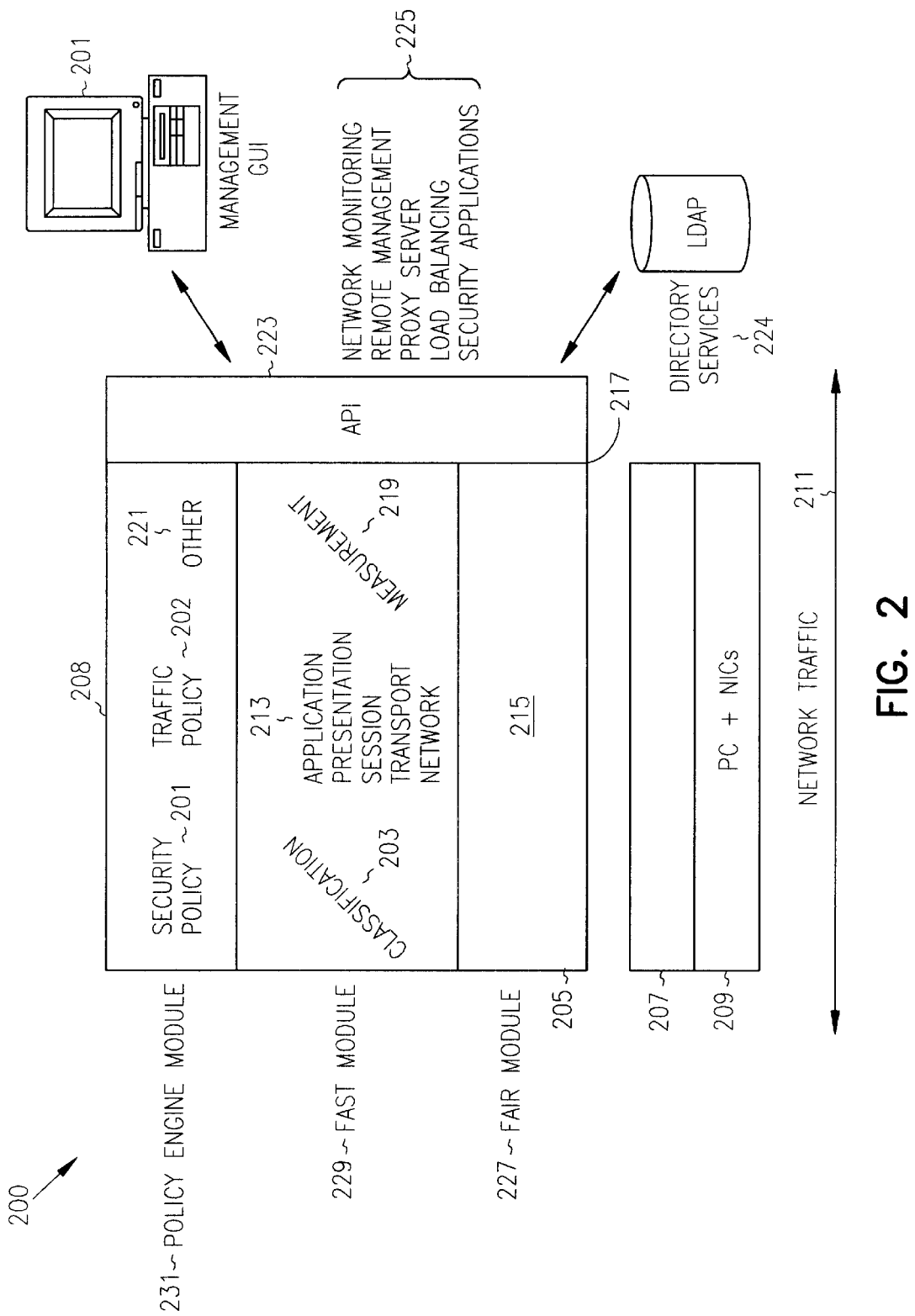
FIG. 2 is a simplified block diagram of system architecture according to an embodiment of the present invention.

FIG. 2 is a simplified block diagram 200 of details of system architecture according to an embodiment of the present invention. The block diagram is merely an illustration and should not limit the scope of the claims herein. The architecture includes a variety of layers that each interface to each other as depicted by the layers. The system includes a network layer 211, which interfaces to incoming and outgoing information to the network. The network can be one of a variety including, among others, Ethernet and Token Ring. A physical layer 209 is disposed above the network layer 211. The physical layer can be personal computers, which are commonly called PCs, or network interface computers, which are commonly called NCs, or alternatively workstations. As merely an example, a personal computer can be an IBM PC compatible computer having a '586-class based microprocessor, such a Pentium™ from Intel Corporation, but is not limited to such a computer or processor. An operating system ("OS") is used on the computer such as WindowsNT™ from Microsoft Corporation, but can also be other OSs. The system is also coupled to a graphical user interface ("GUI") 201 and is coupled to directory services such as, for example, LDAP, but can be others. A detailed discussion of directory services is described in U.S. application Ser. No. 08/998,100 filed Dec. 24, 1997, now issued as U.S. Pat. No. 6,212,568 on Apr. 3, 2001; Ser. No. 08/998,313 filed Dec. 24, 1997; and Ser. No 08/999,096 filed Dec. 24, 1997, now issued as U.S. Pat. No. 6,047,322, which are commonly assigned, and hereby incorporated by reference for all purposes.

Directory services 224 and GUI 201 couple to an application-programming interface ("API") 223. The API is coupled to a traffic management or bandwidth management tool 208 with at least three modules, including a policy engine module 231, a FAST module 229, and a FAIR module 227, which will be discussed in more detail below, but is not limited to these modules. The bandwidth management tool 208 can be predominantly software based and is substantially free from any significant hardware or software changes in the network. In a preferred embodiment, the bandwidth management tool 208 can be loaded onto a server without any changes to hardware. In an alternative preferred embodiment, the tool can install, configure, and operate on a conventional IBM compatible PC running and operating system such as, for example, Windows NT, but can be others. The tool can be deployed at any appropriate point in the network data path. The tool can also be stand-alone at the WAN access point (e.g., behind the Internet access router or behind a firewall), with a conventional firewall or with an NT based proxy/caching server or application server (e.g., a Web server).

Tool 208 performs incoming and/or outgoing management of information over the network of computers. In a specific embodiment, traffic management tool 208 performs inbound and outbound monitoring and control of flows by application, source address, destination address, URL, time of day, day of week, day of month, and other variations. In a specific embodiment, tool 208 also monitors, controls, and produces reports and alarms, which can enhance a whole spectrum of traffic monitoring and control activities ranging from bandwidth/latency control to capacity planning.

In a specific embodiment, the bandwidth management tool adapts to "real" changes on any pre-existing networking system. For example, network infrastructure management involves a continuous process of monitoring, reporting, and deploying changes to match network growth or changing needs in a growing office, for example. These changes exist at various levels and time scales. As merely examples, the network changes, can be to enforce a QoS Policy for a critical service, add WAN bandwidth, segment the network, upgrade a router, choose a guaranteed service level for a web site (e.g., user's own wet site), or notify "Mr. Hog" (i.e., a user occupying too much bandwidth) that he should schedule his large personal downloads at more prudent times such as late at night, for example.

Bandith Management Process

Figure 3:
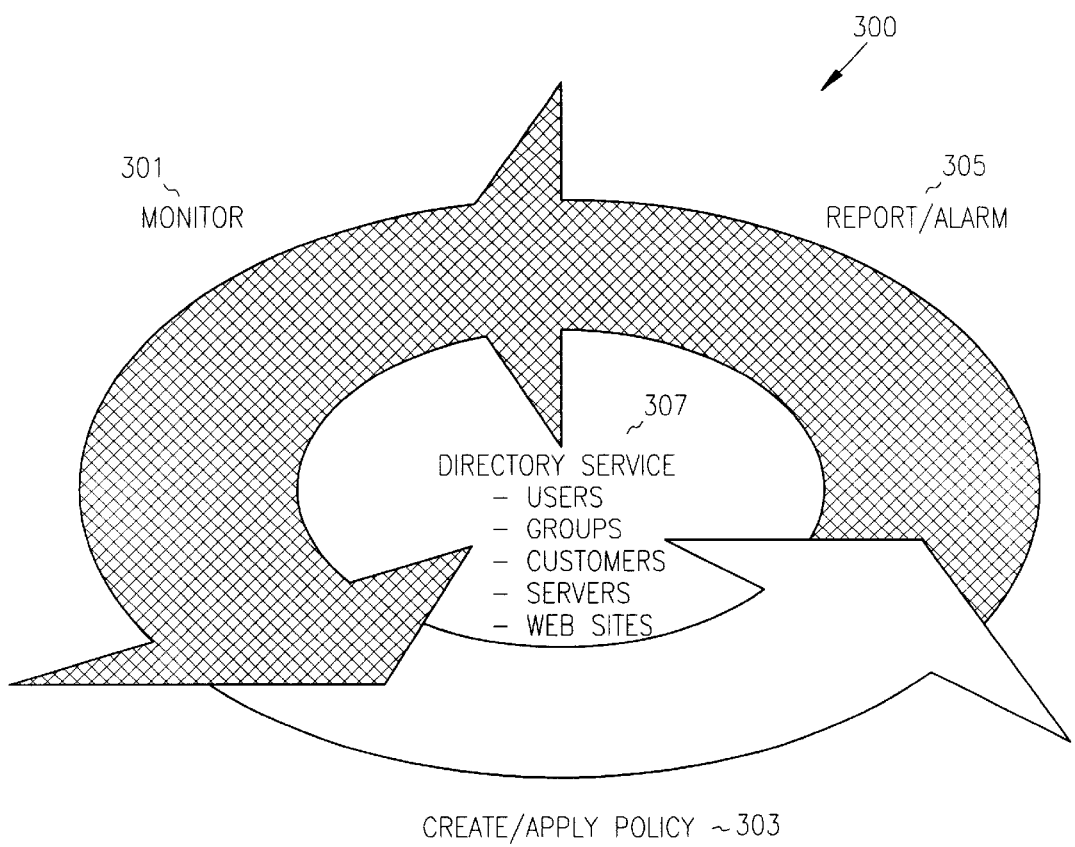
FIG. 3 is a simplified diagram of a traffic management cycle according to an embodiment of the present invention.

The bandwidth management tool can employ these changes using, for example, the process shown in FIG. 3. This process is merely an illustration and should not limit the scope of the claims herein. As shown, FIG. 3 is a simplified diagram 300 of a traffic management cycle according to an embodiment of the present invention. The traffic management cycle is depicted as a continuous cycle, which includes a monitoring phase 301, a creating/applying policy phase 303, and a reporting/alarming phase 305, but is not limited to these cycles. That is, these cycles can be separated or combined depending upon the application. By way of this cycle, the tool can adapt to any changes to the networking system according to the present invention.

In an aspect of the present invention, the present tool can monitor and control activities at various times, e.g., seconds, days, weeks, months, years. Some details with regard to these control activities are shown below under the headings.

1. Second to second

The tool provides second to second time scale monitoring and control of incoming and outgoing traffic over the network. As merely an example, the tool ensures that critical or more important traffic gets a right of way during traffic bursts and provides bandwidth enforcement. Multiple users of the network at a specific time can cause the traffic burst. Alternatively, multiple sessions on the network at a specific time can cause the traffic burst. Once the traffic burst is detected, the tool has a control device, which provides bandwidth enforcement to ensure that the more important traffic gets through the network.

2. Day to day

The tool provides day to day time scale monitoring and control of incoming and outgoing traffic over the network. As merely an example, the tool manages time of day congestion, and responds to intelligent problems or perceived problems. The tool generally deals with problems or limitations that are very specific and isolated to particular users or particular services at particular times that need to be tracked down quickly.

3. Week to week

The tool provides week to week time scale monitoring and control of incoming and outgoing traffic over the network. The tool analyzes traffic usage performance patterns, what services or hosts are active on the network, and troubleshoots chronic problems. In particular, the tool looks at aggregates, such as a particular segment of the network, and compares Websites or compares groups of users for usage of bandwidth and frequency of usage.

4. Longer term activities

The tool provides long term time scale monitoring and control of incoming and outgoing traffic over the network. The tool implements changes in organizational priorities, in billing. The tool also provides service for new applications as they are introduced, and provides for capacity planning for network resources. The present tool can also be used with network stress testing tools to obtain detailed analysis of flows and traffic behavior with/without policy enforcement before a new application is deployed to change the network infrastructure.

Based upon the above description, the present tool can be used to monitor and control incoming and outgoing traffic over a variety of time frequencies. The time frequencies include second by second, day to day, or long term, and combinations thereof, depending upon the application. Of course, the time frequency used depends upon the particular network and applications.

FIGS. 4–7 are simplified diagrams of systems according to various embodiments of the present invention. These diagrams are merely illustrations and should not limit the scope of the claims herein. One of ordinary skill in the art would recognize other variations, alternatives, and modifications. These systems show various deployment scenarios according to the present invention.

1. Internet Service Provider (ISP)

Figure 4:
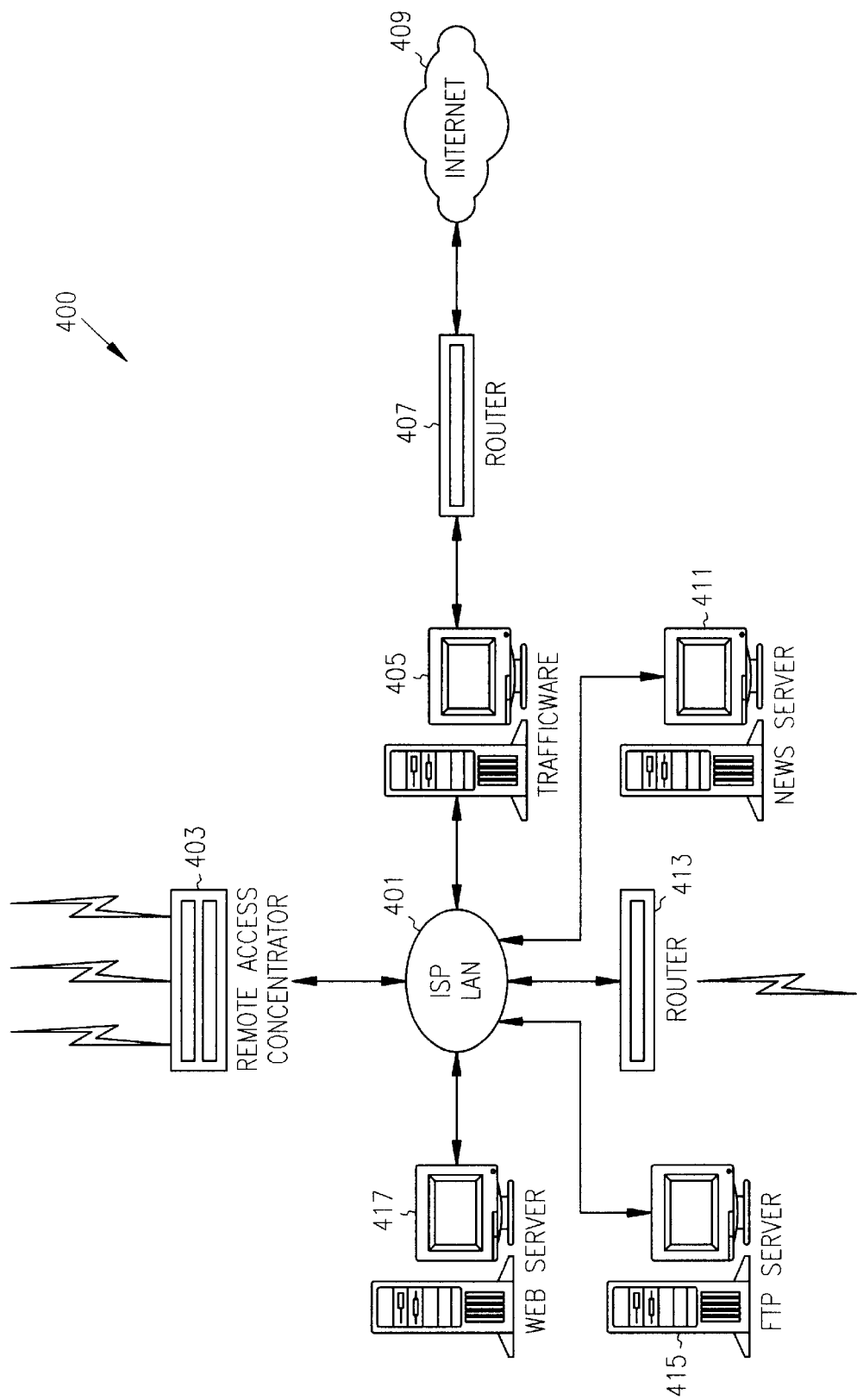
FIGS. 4–7 are simplified diagrams of systems according to various embodiments of the present invention.

FIG. 4 is a simplified diagram 400 of the present tool in an ISP environment according to the present invention. The diagram 400 includes a variety of elements such as an ISP LAN 401, which is coupled to network elements including a remote access concentrator 403, a web server 417, an FTP server 415, a router 413, a news server 411, and others. The tool 405 is coupled between the ISP LAN and router 407, which is connected to the Internet 409. In this embodiment, the ISP is providing a number of services to its customers and the present tool sits by the Internet link and manages inbound and outbound traffic.

2. Web Hosting Deployment

Figure 5:
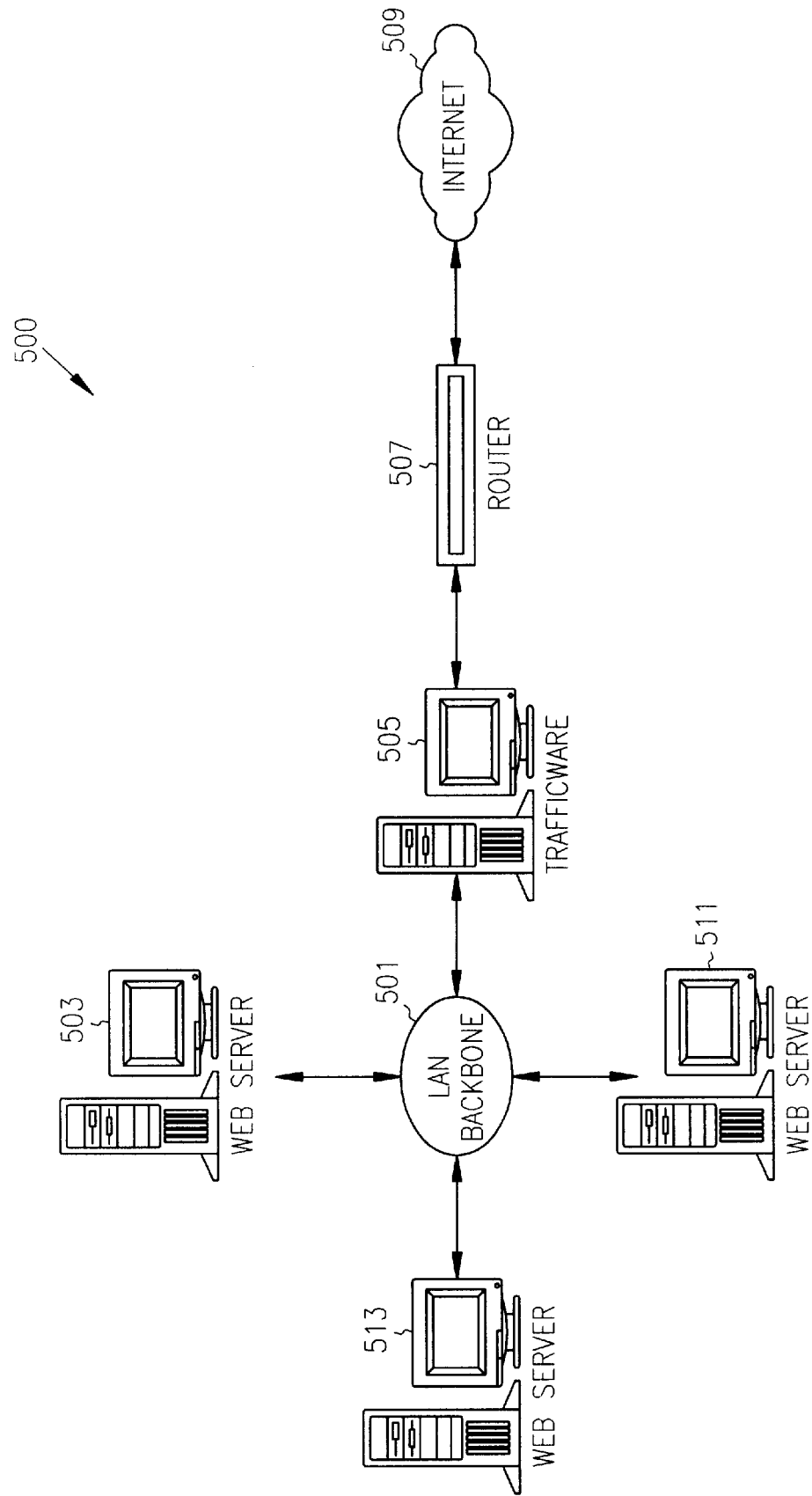

FIG. 5 is a simplified diagram 500 of the present tool in a web-hosting environment according to the present invention. The diagram 500 includes a variety of elements such as a LAN BackBone 501, which is coupled to network elements including web servers 503,511,513, and others. The present tool 505 is coupled between LAN 501 and router 507, which is connected to the Internet 509. In the present embodiment, the tool is being used to manage inbound and outbound traffic between some Websites and the Internet. In a specific embodiment, most of the data being transmitted is multimedia-based, but is not limited as such data.

3. End-User Deployment

Figure 6:
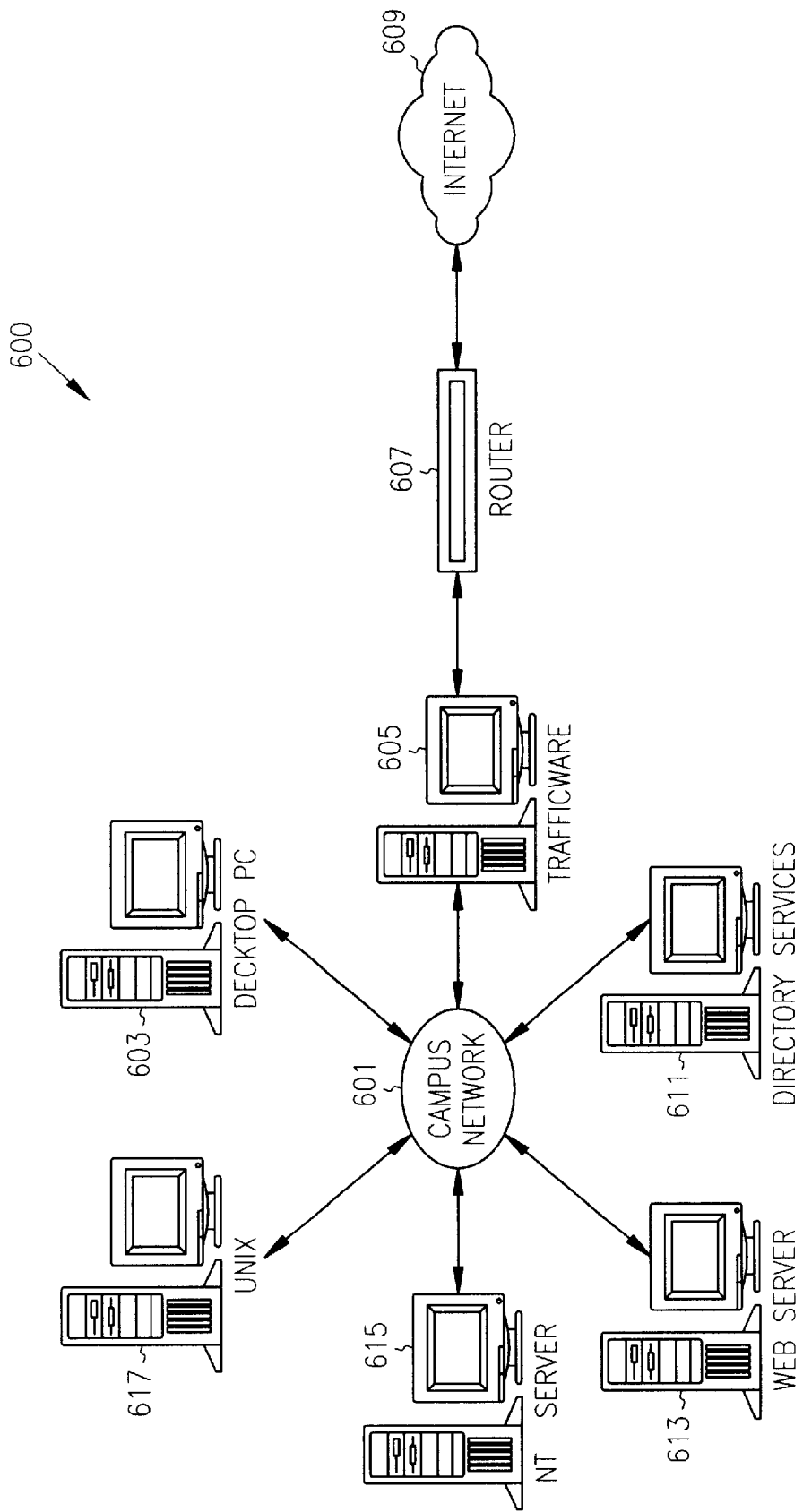

FIG. 6 is a simplified diagram 600 of the present tool in a campus environment according to the present invention. The diagram 600 includes a variety of features such as a campus network 601, which is coupled to network elements such as a desktop PC 603, a UNIX computer 617, an NT Server 615, a web server 613, directory services 611, and others. A bandwidth management tool 605 is coupled between campus network 601 and router 607, which is coupled to Internet 609. In this embodiment, a LAN or WAN supports a number of different setups and configurations, which compete for bandwidth to access the Internet. The present tool acts as an arbitrator for implementing rules, enforcing policies, and setting admissions for classes, as well as performing other acts.

4. Private W AN

Figure 7:
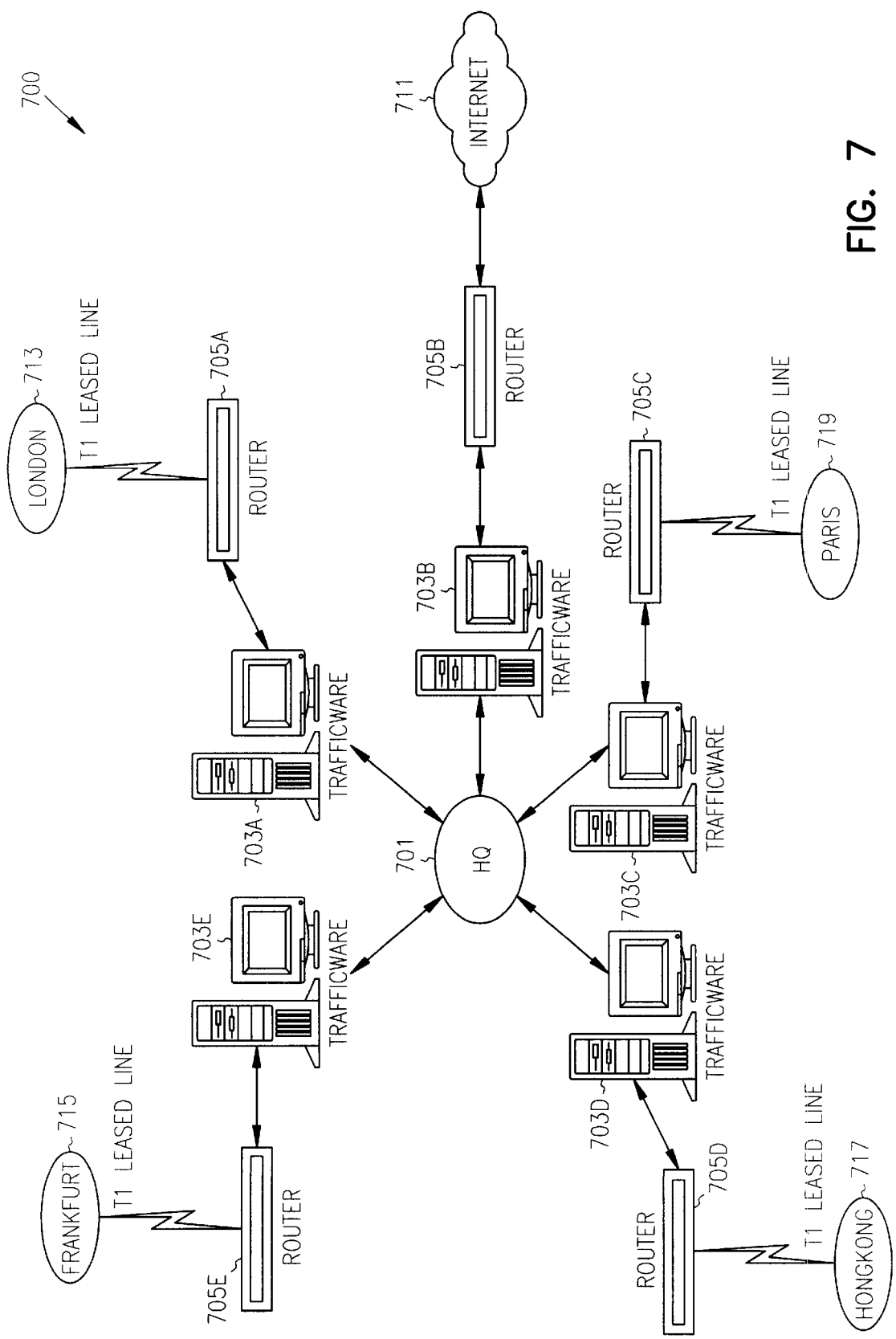

FIG. 7 is a simplified diagram 700 of the present tool deployed for a large corporation that has an Intranet as well as an Internet. The diagram 700 includes a variety of elements or "children" such as a connection to Frankfurt 715, a connection to London 713, a connection to Hong Kong 717, and a connection to Paris 719. Each connection or child includes a router 705A, E, D, C, and the present tool 703A, E, D, C, which is coupled between the router and the hub ("HQ"). In a W AN-based environment, for example, HQ 701 is the hub that handles a number of independent systems (e.g., Frankfurt, London, Hong Kong, Paris), which can be LAN-based. In this embodiment, the present tool 703B. also sits by the Internet 711 and is used to allocate bandwidth between the competing children, e.g., Frankfurt, London, Hong Kong, Paris. Router 705B is coupled between tool 703B and Internet 711.

Although the above descriptions have been made in terms of deploying the present tool in selected environments, the present tool can also be deployed in other environments. For example, the present tool can be deployed in any combination of the above. Alternatively, the present tool can be deployed in any portion of the above environments. Of course, the type of environment used by the present tool depends highly upon the application.

In a specific embodiment, the tool provides an easy to use interface or graphical user interface ("GUI") for performance monitoring and profiling (e.g., accounting). Profiling can be based on active services, clients and servers, among other parameters. Additionally, profiling of the network can be started as soon as the tool is installed into the server of the network. Accordingly, the tool provides immediate accounting and service measurement on a variety of QoS measures.

In a specific embodiment, the present tool generally uses two mechanisms to implement efficient traffic monitoring and traffic control. These mechanisms include processes performed by the FAST module and the FAIR module, which are shown in FIG. 2, for example. Additionally, the present tool uses a policy engine module 231, which oversees the FAST module 229 and the FAIR module 227. Some details of these modules are described as follows.

1. FAST Module (Flow Analysis and Session Tagging)

The FAST module generally provides for monitoring of incoming and outgoing information to and from the network or link. Flow Analysis and Session Tagging ("FAST") implements rich, application level traffic classification, and measurement. This operation is accomplished without introducing slow data paths to minimize latency and maximize overall throughout of traffic through the tool management engine. As shown in the Fig., the FAST module provides for classification 203 of information such as parameters 213 including application, presentation, session, transport, and network. The FAST module also provides for measurement 219 of various parameters. The FAST module is coupled to the API.

2. FAIR Module (Flow Analysis and Intelligent Regulation)

The FAIR module generally implement traffic control and manages bandwidth of incoming and outgoing information to and from the network or link. Flow Analysis and Intelligent Regulation ("FAIR") implements traffic control based on a combination of flow control and queuing algorithms. FAIR's objective provides inbound and outbound traffic management for meaningful time intervals, reducing the load on packet classifiers and packet schedulers. The FAIR module controls 205 incoming and outgoing information to and from the network. Additionally, the FAIR module controls 205 by parameters 215 such as class, session, burst, packet, and others. The FAIR module also controls time 217 of allocating bandwidth for these parameters. The FAIR module is coupled to the API.

3. Policy Engine Module

The policy engine module 231 oversees the FAST and FAIR modules. The engine module also interfaces with the API. In an embodiment, the policy engine module includes a security policy 201, a traffic policy 202, and other policies 221. The security policy provides parameters for securing the present tool. The traffic policy defines specific limitations or parameters for the traffic.

Some definitions about the various modules have been described above. These definitions are not intended to be limiting. One of ordinary skill in the art would recognize other variations, modifications, and alternatives. Additionally, the modules described are generally provided in terms of computer software. Computer software can be used to program and implement these modules, as well as others. The modules can be combined or even separated, depending upon the applications. Functionality of the modules can also be combined with hardware or the like. In a specific embodiment, the present modules are implemented on an WindowsNT™ operating system, which has been developed by Microsoft Corporation. Of course, other operating systems can also be used. Accordingly, the present modules are not intended to be limiting in any manner.

In an embodiment, the present tool can be configured based upon at least the following components-traffic classes, traffic policies, traffic rules, and traffic entities. Some information about these components are described below.

1. Traffic Classes

The present tool identifies data flows at a network'site based on traffic classes. A traffic class is any combination of the following, but is not limited to these:

IP address, subnet, network, netgroup, or range of source or destination; URL of the sender or group of URLs;

Service (e.g., HTTP, FTP) or groups of services;

FTP and HTTP, file types can be. selected as well;

Time of day, day of week/month;

and Inbound and outbound information.

As shown above, traffic classes are directional. Traffic classes configured for inbound traffic are managed separately from traffic classes configured for outbound traffic. For example, the present tool may decide to guarantee a minimum bandwidth to critical traffic so that it is not affected by congestion from large downloads. Additionally, the present tool may want to monitor Push traffic for a while and then choose to limit it if it is perceived as a problem. Traffic classes can also be for measurement only or for control and measurement in some embodiments. These are merely examples and should not limit the scope of the claims herein.

2. Traffic Policies

Traffic policies are generally mechanisms used to control the traffic behavior of specific classes. In an embodiment, the present tool can configure policy properties, which provide, for example:

Bandwidth guarantees—granting classes a minimum bandwidth in the presence of congestion or competition;

Bandwidth limits—establishing a limit on the total bandwidth used by the class;

Setting priorities—establishing a priority order for bandwidth limiting or servicing traffic from a class. (That is, high priority classes are serviced first and are affected the least during contention for bandwidth. Lower priority classes are serviced in order of priority and may be more affected by congestion or contention);

Admission control—establishing conditions under which a new network session or service request is admitted or not admitted. (This kind of policy establishes a broad bandwidth control or service quality for sessions already admitted).

As shown, the present invention provides policies such as bandwidth guarantees, bandwidth limits, setting priorities, admission control, and others. It may assist the reader in understanding some of the terms used in the policies by drawing an analogy with a geographical highway for automobiles. For example, bandwidth relates to how fast one can go (e.g., fast or slow lane) once a user has entered the stream of traffic on the highway. That is, the physical limit for speed in the specific lane chosen. Priority is analogous to how quickly the user is able to enter the highway and move into a designated lane, and how often the user may have to temporarily give way to other vehicles during the drive. Admission control is analogous to the metered lights at the entrance of the freeway where one is made to wait under certain conditions. Of course, depending upon the applications other analogies can be used to explain the policies. Additionally, the policies are merely examples and should not limit the scope of the claims herein.

3. Traffic Rules

A rule generally includes a traffic class and a policy associated with the class. A class can have several policies that apply at different time intervals. 'Rule' is also used to refer to the policy or to a specific row in the present tool user interface. The present tool user interface is described in, for example, U.S. Application No. 60/067,857 filed Dec. 5, 1997.

4. Traffic Entities

The present tool refers to entities in at least two different contexts: defining traffic classes and viewing traffic profiles. For example, a network entity generally refers to an IP address, host, subnet, IP net, IP range, URL or a group of other network entities. A service entity refers to a single service or a group of services. A native entity is referred to in viewing traffic profiles. No rule setting or configuration is required to monitor these entities. When the present tool is installed, it begins to profile traffic based upon detected services, clients, or servers, all of which are called native entities.

5. Guidelines for Developing Traffic Policies

The present invention provides some guidelines for developing traffic policies. For example, to develop meaningfld and effective traffic policies, the present tool may need to understand and take into account one or more of the following:

The kind of business being performed by the user over the Internet. If the user is an ISF, the user may need to develop a business/pricing model that leverages the features of the present tool. If the user is managing corporate access to the Internet, the user may want to identify any business critical services being provided over the Internet The priority of clients, servers and URLs hosted in the user's network or servers access over the Internet. This can be organized as business critical, casual and personal The properties of different applications being used, whether they utilize lots of bandwidth or not, The user may also need to account for the type of files commonly downloaded by users or from the Web site.

Measure and analyze traffic using the present tool's profiles. Additionally, monitoring of selected entities (e.g., users, services) may also be useful.

In a further embodiment, the present tool provides some general guidelines of some commonly used applications. These guidelines should be used in conjunction with business driven priorities, traffic profiling, and selective real-time monitoring to establish an effective traffic policy. Selected guidelines are defined as follows, but are not limited to these.

Delay-sensitive low bandwidth applications, such as TELNET and DNS, are controlled best by setting a high priority policy. The present tool can give the highest priority to all network control traffic such as QoS signaling, session establishment, domain lookup and routing protocols.

Streaming multimedia applications, such as Real Audio/Video and Vxtreme, can hog a lot of bandwidth but are also delay and bandwidth sensitive. If they are not critical, they are controlled best by setting a high priority and a policy to limit admission of sessions so that bandwidth use is capped but admitted sessions have a reasonable quality.

Push technologies, such as PointCast and Marimba, download large files, are not delay or bandwidth sensitive and usually not business critical. They are best controlled by a limiting bandwidth policy and a low priority.

Bulk-data non-interactive applications, such as SMTP and NNTP, should be guaranteed a small bandwidth minimum so that they are not totally squeezed out by congestion or control policies.

Bulk-download, nominally interactive applications, such as FTP or some HTTP downloads, are commonly used in a variety of situations, ranging from critical to casual. Differentiating various types of usage in this case can usually be made only on the basis of file types and/or source or destination addresses. In this case, a small minimum can be guaranteed for more important use.

In bulk-download applications (e.g., file size >20 K Bytes), overall congestion and burstiness can be controlled by slightly limiting this traffic, even if it is just a little below the total available bandwidth (e.g., 90%). The present tool can provide smoothing controls on this traffic without impacting overall perceptible performance for these downloads. This is particularly useful at lower link speeds (128 K and below).

Mission critical applications, such as Lotus Notes, Oracle SQLNet, and LDAP, are controlled best by setting a high priority with a guaranteed bandwidth minimum.

The above provides some guidelines for commonly used applications according to the present invention. Using the above guidelines, the present tool can effectively allocate bandwidth on a network, for example. Again, the above guidelines are merely examples and should not limit the scope of the claims herein.

Figure 8:
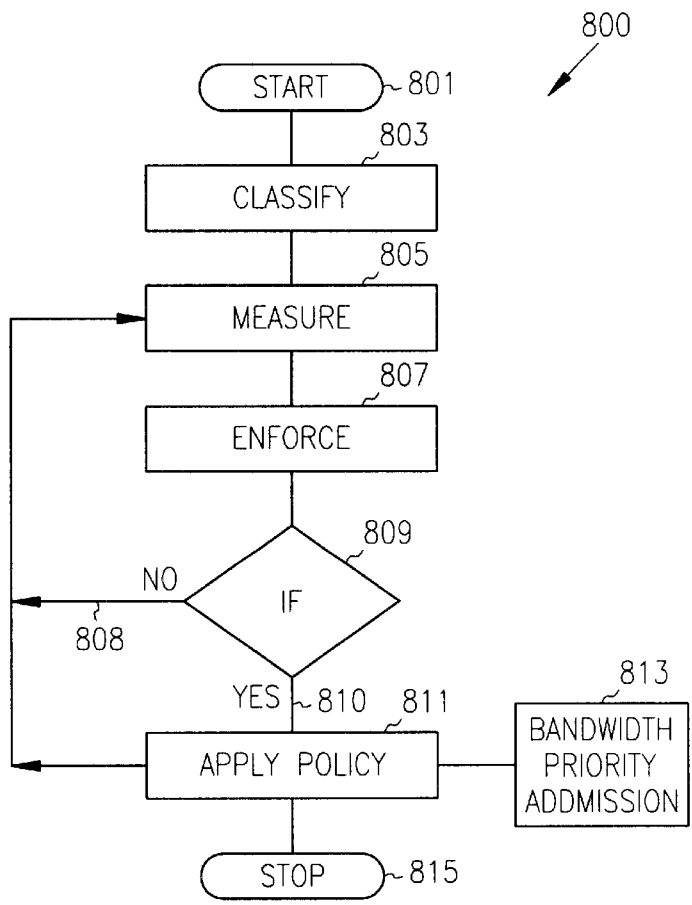
FIG. 8 is a simplified flow diagram of a rule-based control method according to the present invention.

In a specific embodiment, the present tool provides a comprehensive, flexible, role-based paradigm for implementing traffic control, as illustrated by a simplified flow diagram 800 of FIG. 8. This flow diagram 800 is merely an illustration and should not limit the scope of the claims herein. One of ordinary skill in the art would recognize other variations, modifications, and alternatives. Before explaining the flow diagram, it may assist the reader by reviewing some general terms used herein.

These terms include, among others, "roles" and "classes" and "policies." Rules can be created for very specific groups of flows or more general groups of flows, which are commonly all the stuff that transmits to and from a link to a gateway point. Groups of flows are also referred to as traffic classes, but are not limited to such classes. Classes also can be defined by source, destination, application, file types, URLs, and other features. Policies can be specified to control traffic flows in terms of overall bandwidth guarantees, bandwidth limits, priority of service, how individual sessions within a class are serviced or admitted, and other aspects. The present tool also has intelligent policy validation that prevents users from defining any contradictory or ambiguous rules. Policy validation is generally a higher level check used by way of the present method.

The present method occurs at start, which is step 801, for example. In general, a flow of information or data or packets of information enter a gateway point, where the present tool sits. The present method classifies (step 803) the flow of information. Groups of flows can be referred to as traffic classes, but are not limited to such classes. Classes also can be defined by source, destination, application, file types, URLs, and other features. Other examples of classes were previously noted, but are not limited to these classes. In general, step 803 classifies the flow of information received into one of a plurality of predetermined classes.

The present tool measures parameters for each of the classes in step 805, which were received, for example. These parameters are based upon the policy or rule, which may be applied in a later step. As merely an example, parameters include the class itself, file sizes, and other information, which can be used by the policy or rule to apply the policy or rule to improve the quality of service for the network. After measuring the parameters, the present method applies a time stamp (step 807) on the parameters to correlate the class of information received to a time, for example.

A step of determining whether to apply a policy occurs in the next step 809. For example, if the class and the time (and the link-state in some embodiments) meet predetermined settings, the policy is applied to the class in step 811 through branch 810. Alternatively, if one of the elements including the class, the time, or the link-state do not meet the predetermined settings, the policy does not apply and the process continues to measure parameters through branch 808. Alternatively, the process continues to measure parameters through branch 813 after the policy is applied to the flow of information for the class.

Depending upon the application, the policy is used to improve the quality of service of the network by performing at least one of a number of functions for the class of information from the flow. These functions include, among others, bandwidth guarantees, bandwidth limits, setting priorities, admission control. The present process can also halt or stop as shown in step 815. The steps occur, in part, by way of the modules, which were previously described, but can also occur using other techniques including a combination of hardware and software, for example. These sequences of steps are merely illustrative and should not limit the scope of the claims herein. One of ordinary skill in the art would recognize other modifications, alternatives, and variations.

In a preferred embodiment, the present invention uses a variety of graphical user interfaces for profiling and monitoring traffic. FIGS. 9A–15 is simplified representations of graphical user interfaces for monitoring traffic according to the present invention. These representations are merely illustrative and should not limit the scope of the claims herein. One of ordinary skill in the art would recognize other variations, modifications, and alternatives.

Figure 9A:
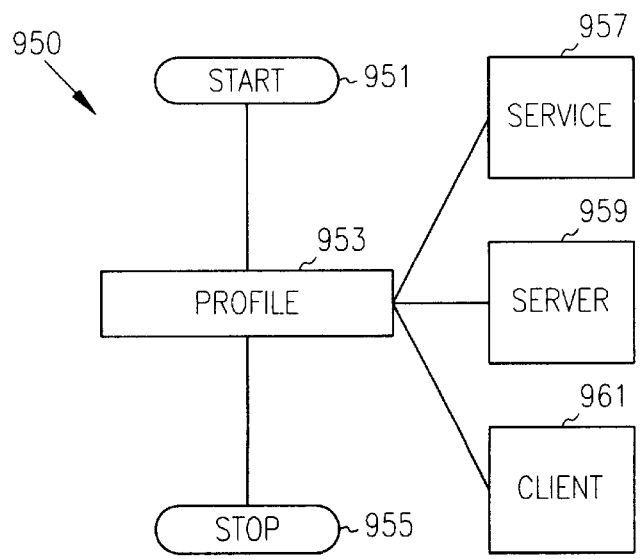
FIGS. 9–15 are simplified representations of graphical user interfaces for monitoring traffic according to the present invention.
Figure 9:
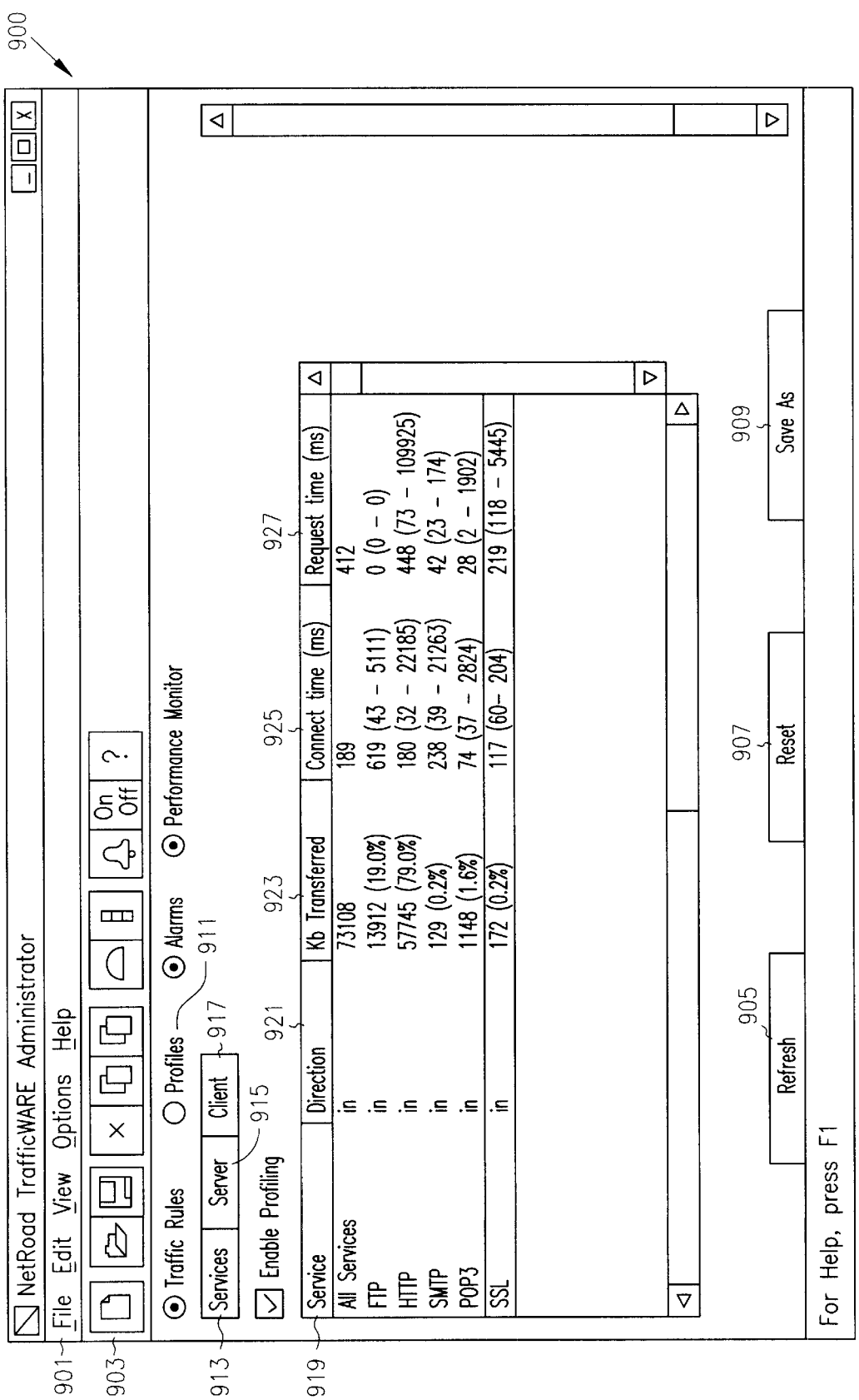

FIG. 9A is a simplified flow diagram 950 of a profiling method according to the present invention. Profiling or monitoring traffic can occur using one of a plurality of user interfaces or graphical user interfaces. The present invention provides a profiles tab 953, which can be selected using a mouse or keyboard interface. The present method begins with a start step, which is step 951. Upon selecting a profiles tab 953, one of a plurality of tabs is prompted. These tabs represent services 957, server 959, and client 961. These tabs display relevant traffic statistics by every active service, server and client, respectively. By selecting one of the tabs, the present tool sorts data or information in ascending order by clicking on any header (e.g., Kb Transferred), as illustrated by FIG. 9 for a service tab 900. Other functions that can be performed using one of the profiles and the graphical user interface include:

Click the Refresh button, all data is updated from the profiling engine.

Click the Reset button 907, clears all the respective data from the profiling engine.

Click the Save As 909 button to save the respective data to a log file. The data is saved as tab-separated text.

Each of the present user interfaces also includes function keys 901 and a tool bar 903. Upon selecting the profiles tab, a profiles light or display indication illuminates 911. As shown, the main profiles tab also includes tabs for services 913, server 915, and client 917. Additional features of the various tabs including the services tab, the server tab, and the client tab are described below and refer to FIGS. 9, 10, and 11, respectively, but are not limited to these descriptions.

1. Services Tab

FIG. 9 is a simplified diagram 900 of a representation of a graphical user interface for a services tab according to the present invention. In particular, the dialog box displays cumulative traffic statistics for selected applications. The services tab, which can be selected by default, provides the following information:

Service Name
    This field 919 shows what services (e.g., All Services, FTP; HTTP, SMTP, POP3, SSL) the network uses. Summary statistics for all services (e.g., inbound or outbound) are also shown. Traffic from services that are not recognized by the present tool is indicated as 'Others'.

Direction
    This field 919 indicates whether the service is inbound or outbound.
    Note: Inbound and Outbound refer to the direction of data flow, not the request.

Kb Transferred
    This field 923 shows the amount of data transferred in inbound or outbound direction. As shown, the amount of data can be in kilobits transferred. Additionally, the amount of data can be referred to as a percentage of all services.

Connect Response Time
    This field 925 indicates an average time to establish a session. The connect response time is in milliseconds, but is not limited to this time. The minimum and maximum connect response time is also shown in parenthesis.

Request Response Time
    This field 927 indicates an average response time for an application request. The request response time is in milliseconds, but is not limited to this time. The minimum and maximum request response time is also shown in parenthesis.
    Note: This measure is application specific and does not apply to all services. For example, for HTTP, it is the time taken by a URL to start sending data after a request for a file was made by a Web browser.

Total Sessions
    This field (not shown) indicates the total number of sessions established for this service.

Retries
    This field (not shown) indicates the percentage of connect requests that needed to be retried. Retries can result from network congestion, packets dropped in the network or server congestion.

Server Aborts
    This field (not shown) indicates the percentage of sessions aborted by the server.

Time
    This field (not shown) indicates the last time the service was active.

2. Server Tab

Figure 10:
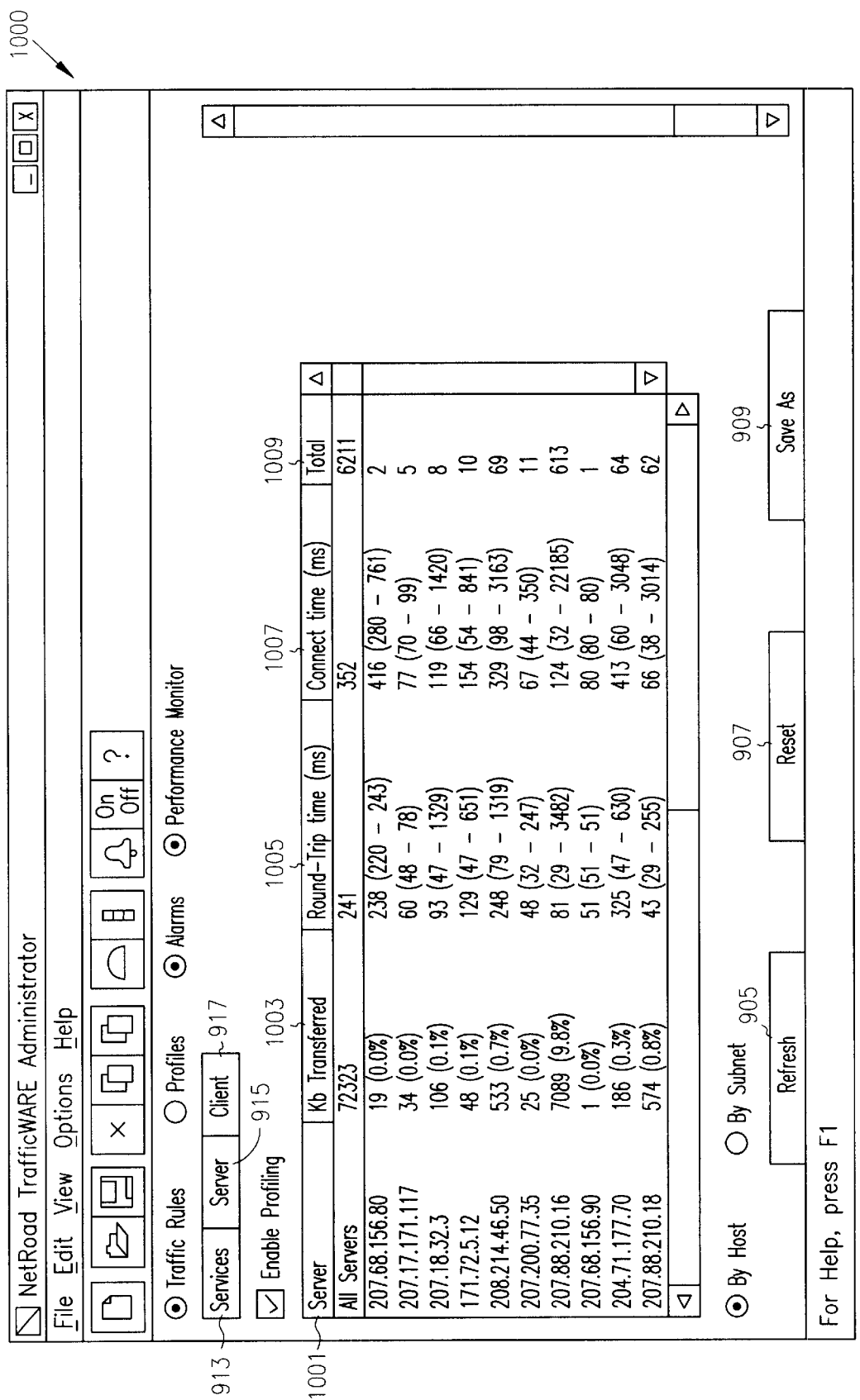

FIG. 10 is a simplified diagram 1000 of a representation of a graphical user interface for a server tab according to the present invention. Upon selecting or clicking the server tab 915, screen 1000 appears. The dialog box displays cumulative traffic statistics for every active server. The server tab provides the following information, but is not limited to such information:

Server
    This field 1001 shows the server host name, URL or IF address. Summary statistics for all servers are also shown.

Note
In one aspect of the invention, the present tool can profile up to 256 servers. Subsequent traffic from new servers is indicated as 'Others'.
Host names can also be displayed in some embodiments.

Kb Transferred
    This field 1003 shows the amount of data transferred from the server. As shown, the amount of data can be in kilobits transferred. Additionally, the amount of data can be referred to as a percentage of all services.

Round Trip Time
    This field 1005 indicates an average round trip delay for packets sent to the server. The round trip time is in milliseconds, but is not limited to this time. The minimum and maximum round trip time is also shown in parenthesis.

Connect Response Time
    This field 1007 indicates an average time to establish a session with the server. The connect response time is in milliseconds, but is not limited to this time. The minimum and maximum connect response time is also shown in parenthesis.

Total Sessions
    This field 1009 indicates the total number of sessions established to the server.

Retries
    This field (not shown) indicates the percentage of connect requests that needed to be retried. Retries can result from network congestion, packets dropped in the network or server congestion.

Server Aborts
    This field (not shown) indicates the percentage of sessions aborted by the server.

Access Speed
    This field (not shown) indicates the bottleneck speed for the route between the present tool as a host and a server.

Data Retransmits
    This field (not shown) indicates the percentage of data packets that were retransmitted by the server.

Time
    This field (not shown) indicates the last time data was received from the server.

3. Client Tab

Figure 11:
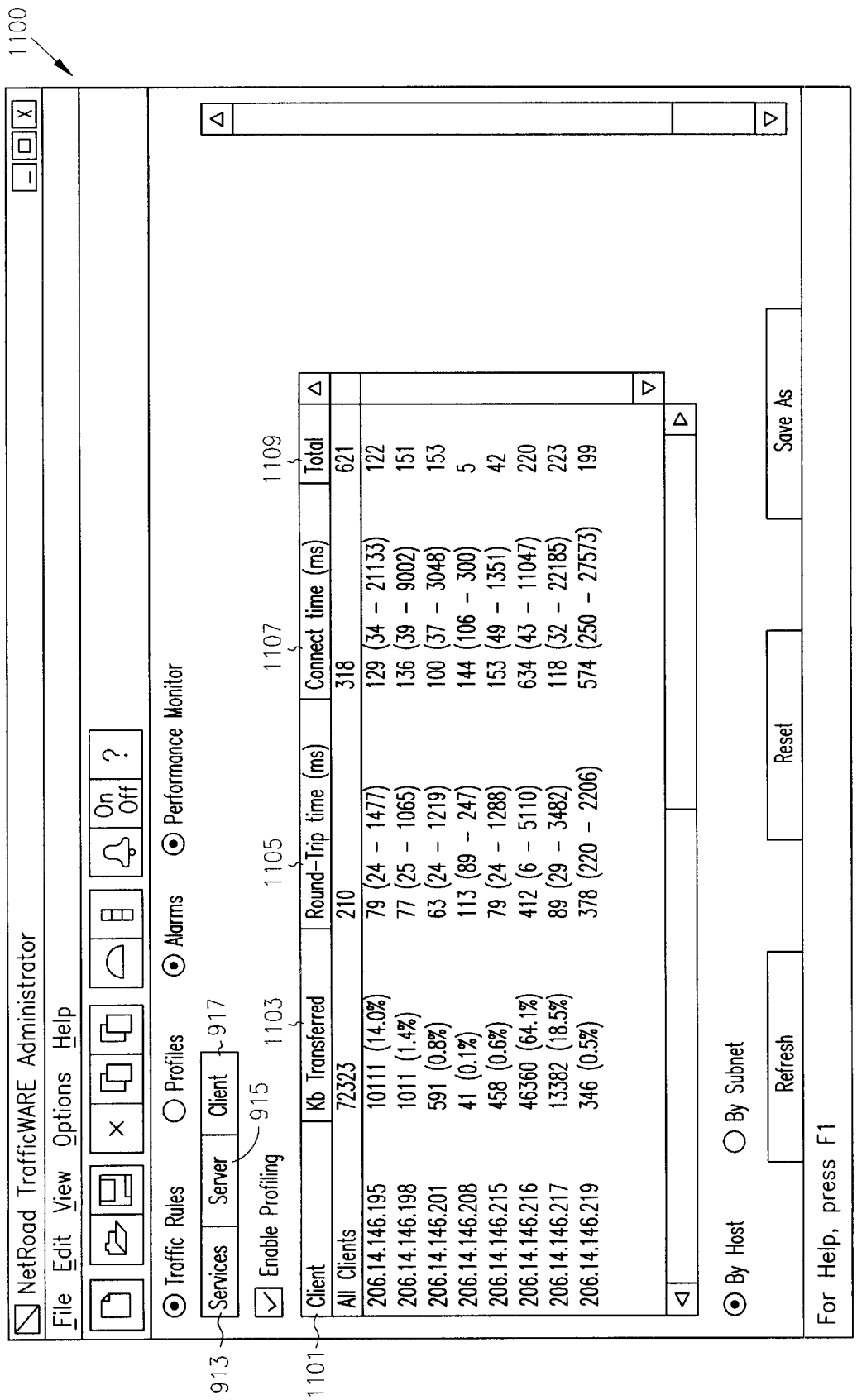

FIG. 11 is a simplified diagram 1100 of a representation of a graphical user interface for a client tab according to the present invention. When the client tab 917 is selected or is clicked using a user interface, screen 1100 appears. The dialog box displays the cumulative traffic statistics for the clients. The client tab provides the following information, but is not limited to such information:

Client
    This field 1101 shows the client host name or IF address. Summary statistics for all clients are also shown.
    Note: The present tool can profile up to 256 clients in some embodiments. Subsequent traffic from the clients are indicated as 'Others'.

Kb Transferred
: This field 1103 shows the amount of data transferred to the client. As shown, the amount of data can be in kilobits transferred. Additionally, the amount of data can be referred to as a percentage of all services.

Round Trip Time
: This field 1105 indicates an average round trip delay for packets from this client. The round trip time is in milliseconds, but is not limited to this time. The minimum and maximum round trip time is also shown in parenthesis.

Connect Response Time
: This field 1105 indicates the average time to establish a session from the client. The connect response time is in milliseconds, but is not limited to this time. The minimum and maximum connect response time is also shown in parenthesis.

Total Sessions
: This field 1109 indicates the total number of sessions established from the client.

Retries
: This field (not shown) indicates the percentage of connect requests that needed to be retried. Retries can result from network congestion, packets dropped in the network or server congestion.

Server Aborts
: This field (not shown) indicates the percentage of sessions aborted by the server.

Time
: This field (not shown) indicates the last time the client received data through. The link used by the present tool.

The present invention provides the aforementioned tool for profiling a variety of information from a flow of information at a communication link. The tool has an easy to use graphical user interface, which can sort information by at least services, client, or server, depending upon the application. The illustrations shown are merely used as examples and should not limit the scope of the claims herein.™

In a specific embodiment, the present invention with graphical user interface begins profiling upon installation. In particular, the present tool is installed onto a server to automatically start profiling traffic in inbound and outbound directions without any further configuration. The present tool can be stopped and restarted manually from a user interface. While the present tool is stopped, profiling is interrupted temporarily.

The present invention provides additional easy to use graphical tools to monitor and profile traffic. In one aspect, the present invention takes advantage of a Windows NT Performance Monitor to monitor traffic for any measurement or control rule that is created. In another aspect, the present invention can launch the Performance Monitor from the 'Administrative Tools' Program group and select counters for monitoring incoming and outgoing traffic from a link.

Figure 12:
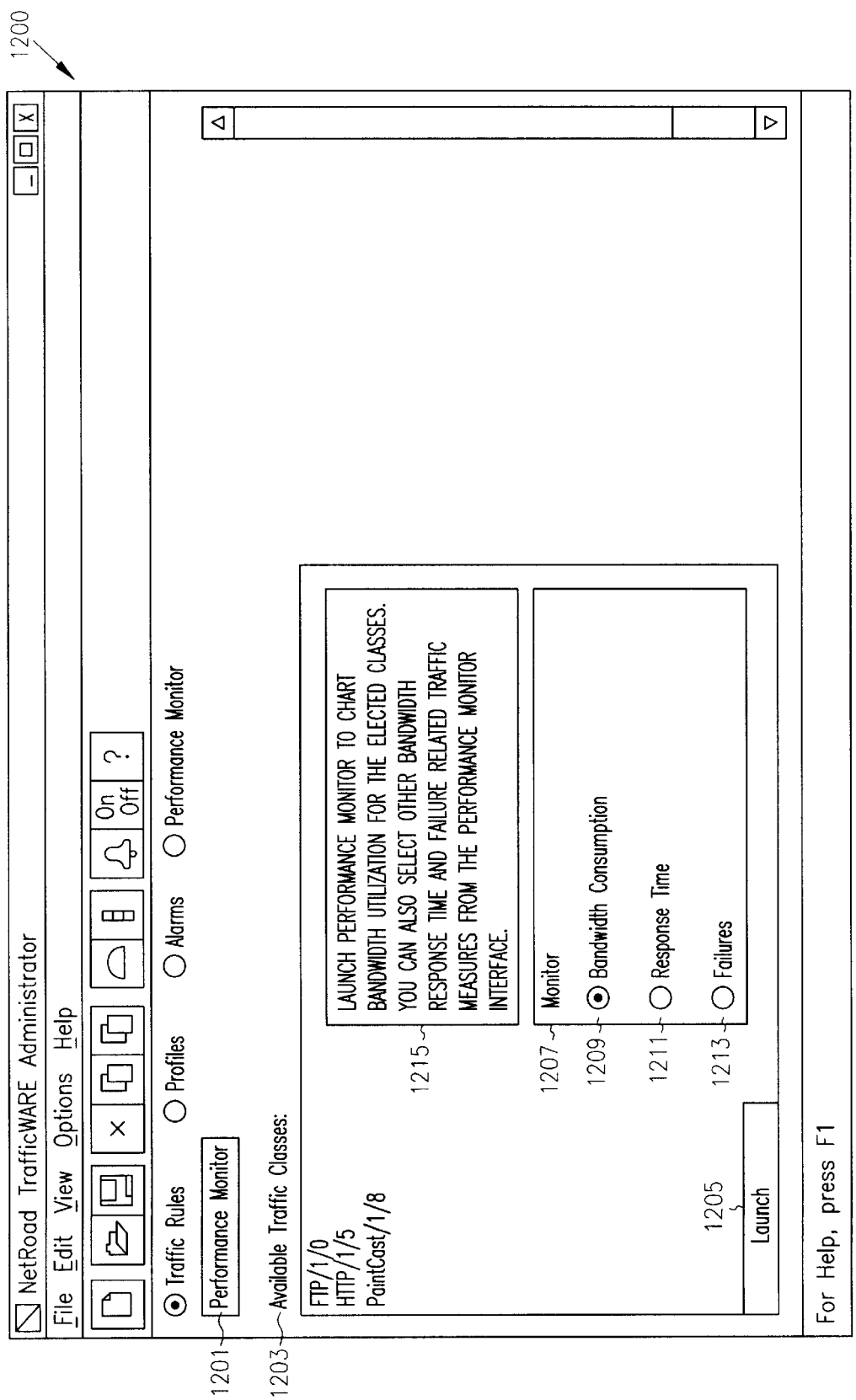

FIG. 12 is a simplified graphical user interface 1200 to launch a performance-monitoring tool according to the present invention. This interface is merely an illustration and should not limit the scope of the claims herein. A method for launching the present tool occurs, in part, by selecting or clicking on the performance monitor tab 1201. The display shows available traffic classes 1201 (e.g., FTP, HTTP, PointCast), which have been defined in the traffic policy. Note that a traffic class is not a rule. There may be more than one rule that belongs to the same traffic class. Traffic classes are created when rules are edited. A traffic class is defined by at least a source, destination, and service properties. The display includes a group of option buttons 1207 titled monitor, which allows a user to specify whether the user wants to monitor bandwidth consumption 1209, connect time 1211, or connect retries 1213 for the selected classes. A prompt box 1215 above the option buttons 1207 provides a brief explanation of the selected option. A Launch button 1205 launches the performance monitor too. To launch the present performance monitor tool:

1. Select one or more traffic classes 1203 in the list.
2. Choose monitor by clicking on an appropriate option button (e.g., bandwidth consumption, response time, failures) 1207 in the monitor group.
3. Push launch button 1205.

Figure 13:
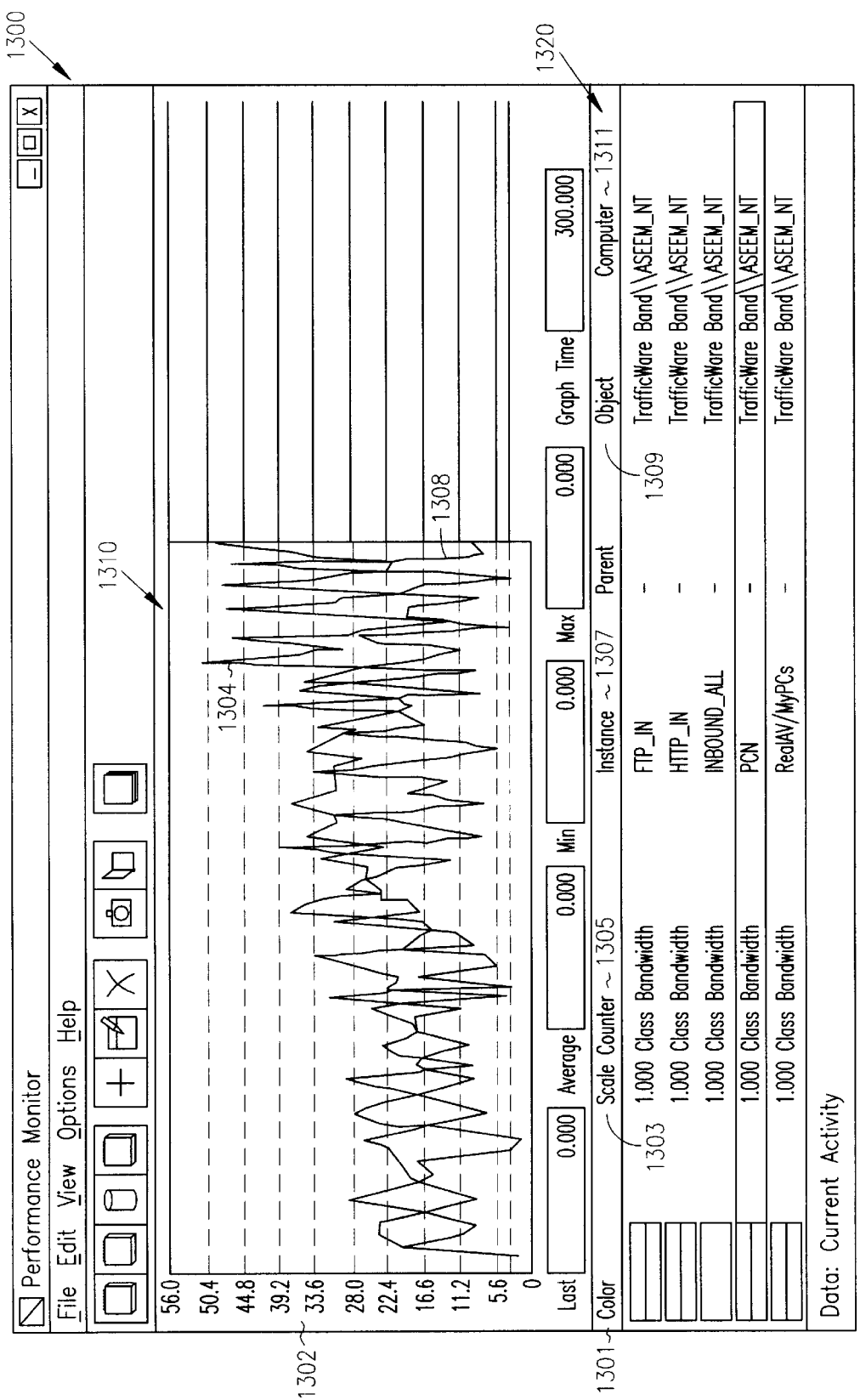

As merely an example, FIG. 13 is a simplified graphical user display 1300 for bandwidth consumption according to the present invention. As shown, the Fig. is an example of Class Bandwidth 1305 monitoring for a few services 1307 such as FTP, HTTP,. etc. over a 56 Kbit Internet link. The vertical axis 1302 illustrates a bandwidth scale from "0" to "56.0" kbits and the horizontal axis represents time 1306. The plurality of line plots 1304 each represent one of the services 1307, which are each color coded 1301 for easy reading by the user. The display also includes an object 1309 and a computer 1311, which is being used to monitor the traffic. Accordingly, the present display includes a graphical portion 1310 and a text portion 1320. The graphical portion includes the plurality of plots representing the services for bandwidth consumption as functions of time. The text portion is in the form of a legend, but can also include other information.

The illustration in the above Fig. is merely an example and should not limit the scope of the claims. Although the present example has been described in terms of bandwidth consumption, the present performance monitor tool can also be used to monitor a variety of other parameters; as discussed above. These other parameters include, among others, connect time, or connect retries for the selected classes. Furthermore, the present tool has other types of charts such as a bar chart, a pie chart, and the like. Of course, the parameter being profiled and monitored depends upon the application.

Figure 14:
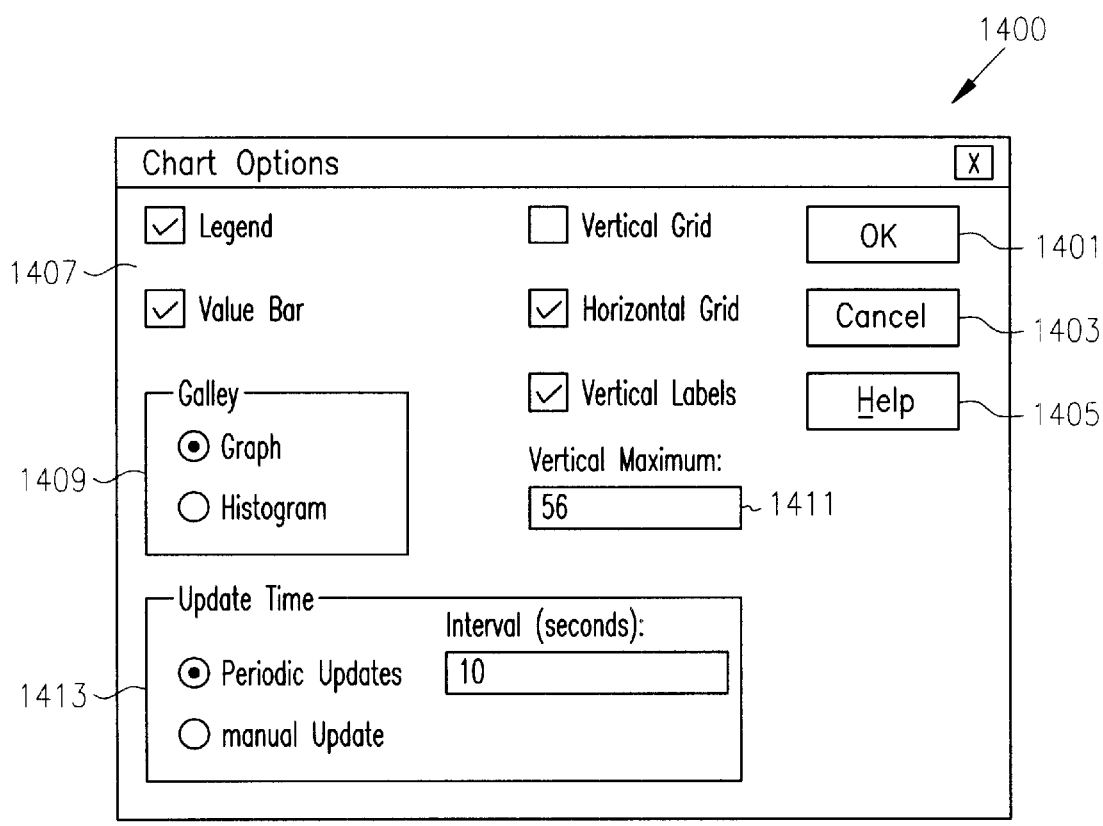

In an alternative embodiment, the present invention provides a user interface for modifying the plots or charts, such as the one previously described, as well as others. FIG. 14 is a simplified interface tool 1400 used to modify chart styles, scales, charting intervals etc. This tool is merely an example and should not limit the scope of the claims herein. The present tool has an "OK" button for saving or storing selected chart options. A "cancel" button 1403 is also shown to delete or remove selected chart options. A help button 1405 is shown to identify features of any of the chart options. Numerous chart options 1407 exist. For example, options include, among others, a legend, a value bar, a vertical grid, a horizontal grid, and vertical labels. To select anyone of these options, the user clicks onto the box located next to the option or enters the underlined key designating the option. Chart options also include a gallery 1409, either in graph or histogram form. Additionally, the chart can have a maximum vertical scale 1411 such as the 56 for 56 kbits/second. Furthermore, the chart can have a refreshing or updating cycle time 1413. In one aspect, the cycle time can be manually updated. Alternatively, the cycle time can be periodically updated. When using the periodically updating feature, a time interval (e.g., seconds) needs to be specified and entered into a field, as shown.

Figure 15:
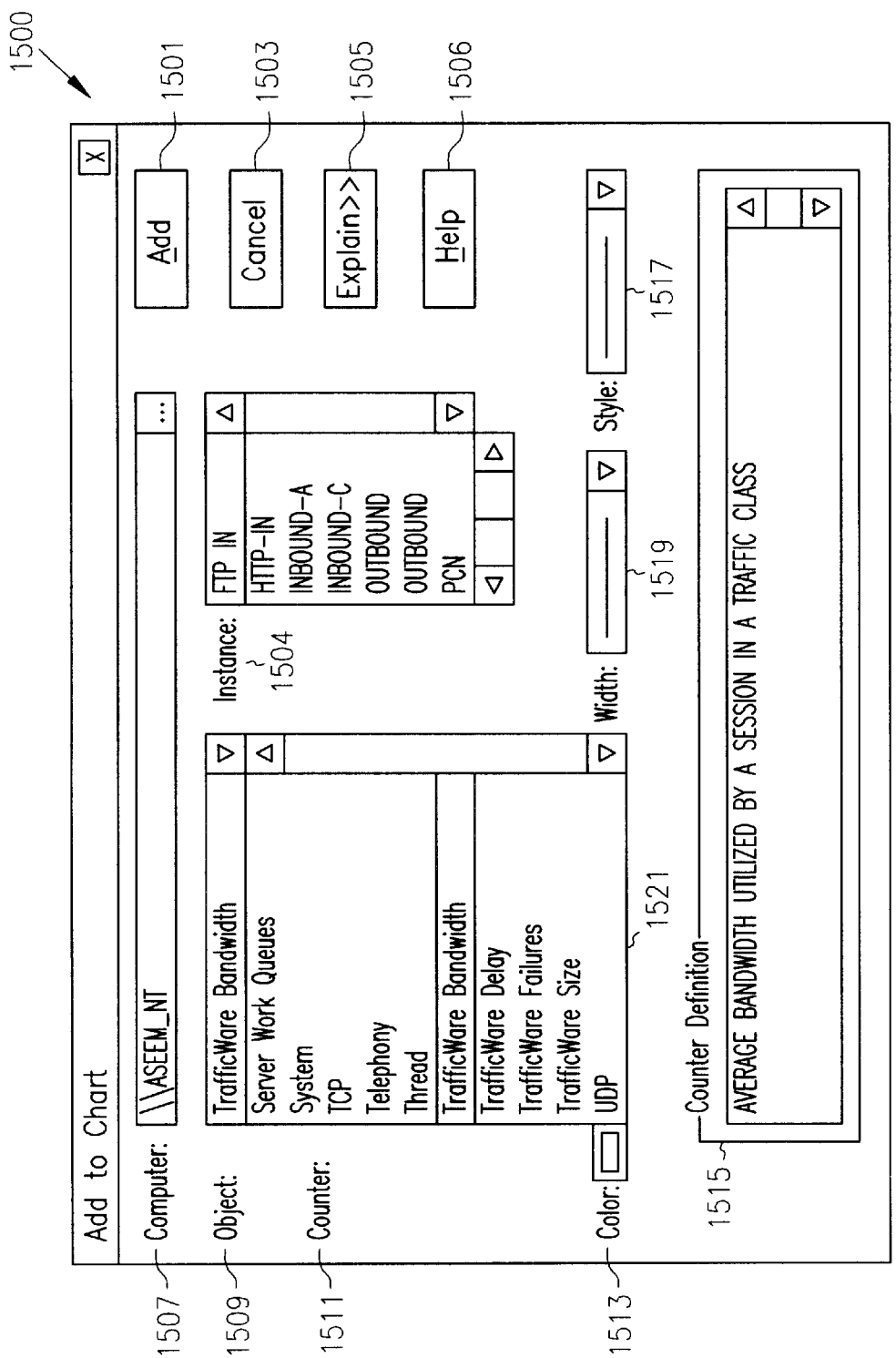

FIG. 15 is a simplified graphical user interface 1500 for adding or specifying an additional chart according to the present invention. This interface or tool is merely an example and should not limit the scope of the claims herein. This interface allows the user to select the parameters to be monitored on the chart. These parameters include, among others, the computer to be monitored 1507, the object 1509, the counter 1511, and the instance 1514. Depending on the types of parameters being monitored or profiled, specific visual details of the plots or charts are also selected. These details include the plot color 1513, the plot width 1519, the plot style 1517, and others. A counter definition 1515 is also made or selected. Once all the changes have been made or selected, the user can add the changes to be monitored by the tool by pressing or selecting the add button 1501. Alternatively, the user may start over by selecting the cancel button 1503. If the user would like an explanation on anyone of the features described in the tool, the user may select either the explain button 1505 or the help button 1506. Of course, this user interface is merely an example and should not be limiting any manner outside the spirit and scope of the claims.

In yet an alternative aspect, the present monitoring or profiling tool has a save feature for storing the chart or plot. In particular, the present tool can save snapshots of measurements to a disk file or the like. As merely an example, the present tool saves snapshots using the following sequence of steps, which should not be construed as limiting:

Go to view/log in the tool to configure a log file;

Add measurements to the file and start and/or stop logging.

Furthermore, the present tool provides congestion, utilization, and performance degradation reports, which make day to day troubleshooting much simpler and serve to justify or validate policy-setting decisions. For example, a chronic problem affecting a service through a day period (i.e., 24 hour) can be monitored by a combination of real-time monitoring and congestion reports. By monitoring and using the reports, it may be determined that the affected service is not getting its due share of bandwidth, or a limitation exists with the server or in the Internet backbone.

Conclusion

In the foregoing specification, the invention has been described with reference to specific exemplary embodiments thereof. Many changes or modifications are readily envisioned. For example, the present invention can be applied to manage a variety of TCP/IP network traffic types for the Internet and Intranet. Further, the techniques can also be applied to Novell SPX, Xerox XNS or any protocol with a similar 'flow-control' design that utilizes windows and acknowledgment signals (similar to ACK).

Alternative embodiments of the present invention can also be applied to a 'legacy' private WAN running IP as well as native Novell protocols if there is a need (e.g., file server and client/server traffic). Further, embodiments of the present invention can include monitoring, billing, and reporting features, thus allowing for enhanced client billing and internal cost accounting of network usage.

These techniques are preferably implemented within a firewall platform to solve provide the following benefits: bidirectional bandwidth management of network links carrying TCP traffic; reactive (short-time scale) and proactive (long time scale) control mechanisms; and gateway (local) and end-end (global) techniques for bandwidth control. This solution reduces their contribution to congestion in the Internet, and all ows for operation in a present day heterogeneous wide area networks, such as the Internet, without requiring any client, server or router changes.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer system coupled to a network of computers, said computer system for monitoring and managing a plurality of flows of information, said computer system comprising:

a graphical user interface component that generates a display, said display comprising at least a first portion and a second portion, said first portion comprising a graphical chart representing said flows of information, said second portion comprising text information describing each of said flows of information;

an application programming interface (API) component coupled to said graphical user interface component; and a traffic control and management component, coupled to said application programming interface component, that controls an amount of bandwidth allocated to said plurality of flows of information, said traffic control and management component comprising:

a first application, coupled to said API component, that classifies said plurality of flows of information into parameters and measures said parameters;

a second application, coupled to said API component, that controls said plurality of flows of information into and out of the network of computers and allocates said bandwidth allocated to said plurality of flows of information; and a third application, coupled to said API component, that applies a traffic policy associated with one or more traffic rules in said first and second applications, and wherein the one or more traffic rules are adapted to be manually edited and/or created.

2. The computer system of claim 1 wherein said plot of bandwidth consumption is a plot of bandwidth consumed against time.

3. The computer system of claim 1 wherein said plot of bandwidth consumption is a plurality of plots, each of said plots representing consumed bandwidth against time.

4. The computer of claim 1 wherein each of said flows of information comprises one of a plurality of traffic classes.

5. The computer of claim 4 wherein said plurality of traffic classes comprise HTTP, FTP and SMTP.

6. The computer system of claim 1 wherein said graphical chart comprises a plot of failure rates against time.

7. The computer system of claim 1 wherein said graphical chart comprises a plot of delay rates against time.

8. The computer system of claim 1 wherein said display is outputted on a computer monitor.

9. The computer system of claim 1 wherein said display is a real-time display of a portion of said plurality of flows of information.

10. The computer system of claim 1 wherein said graphical chart is selected from a graph, a histogram, a bar chart, and a pie chart.

11. The computer of claim 1 wherein said graphical chart comprises a plot of bandwidth consumption.

12. A computer system connected to a network of computers, said computer system for monitoring and managing in real time a plurality of flows of information, each of said plurality of flows of information being of one of a plurality of traffic classes, said computer system comprising:

a graphical user interface component that generates a display on a monitor, said display comprising at least a first portion and a second portion, said first portion comprising a graphical chart representing said traffic classes and said second portion comprising text information describing each of said traffic classes, wherein said graphical chart comprises a bandwidth consumption plot for each of said traffic classes; and a traffic control and management component, coupled to said graphical user interface component, said traffic control and management component comprising:

a first module that monitors said plurality of flows of information to and from said network of computers by classifying information into a first set of parameters and measuring said first set of parameters;

a second module that implements traffic control and manages bandwidth allocation by controlling said plurality of flows of information to and from said network of computers using a second set of parameters and allocating bandwidth based in part on said second set of parameters; and a third module that applies a traffic policy associated with one or more traffic rules in said first and second modules, and wherein the one or more traffic rules are adapted to be edited and/or created.

13. The computer system of claim 12 wherein said bandwidth consumption is a plot of bandwidth consumed against time.

14. The computer system of claim 12 wherein said bandwidth consumption is a plurality of plots, each of said plots representing consumed bandwidth against time for each of said traffic classes.

15. The computer system of claim 12 wherein said plurality of traffic classes comprise FTP, HTTP, and SMTP.

16. The computer system of claim 12 wherein said graphical chart further comprises a plot of failure rates against time or a plot of delay rates against time.

17. The computer system of claim 12 wherein said graphical chart is selected from a graph, a histogram, a bar chart, and a pie chart.

18. A method in a computer system for managing and monitoring a plurality of flows of information, said method comprising the steps of:

allocating bandwidth to a plurality of flows of information between one or more sources coupled to a network of computers;

measuring a data rate for each one of said flows of information, each one of said flows of information being of one of a plurality traffic classes;

applying a traffic policy associated with one or more traffic rules for said each one of said flows of information, wherein the one or more traffic rules are adapted to be edited and/or created;

categorizing each one of said flows of information into one of said plurality of traffic classes;

measuring a parameter for said each one of said flows of information associated with said one of said plurality of traffic classes;

applying a time stamp to said parameter to correlate said one of said plurality of traffic classes with a time;

determining a data rate for each one of said plurality of traffic classes;

outputting a visual representation of the data rate of at least one of said plurality of traffic classes in graphical form on a display; and outputting a text representation of said at least one of said plurality of traffic classes on said display.

19. The method of claim 18 wherein said data rate is a baud rate.

20. The method of claim 18 wherein said visual representation is a real time histogram of said data rate.

21. The method of claim 18 wherein said plurality of traffic classes comprise HTTP, FTP, and SMTP.

22. A computer system comprising a bandwidth profiling and management tool for monitoring and managing a plurality of flows of information between one or more sources coupled to a network of computers, each of said plurality of flows of information comprising one of a plurality of traffic classes, said bandwidth profiling and management tool being stored in computer memory, said computer memory comprising:

a first code that is directed to allocating bandwidth to said plurality of flows of information;

a second code that is directed to measuring a data rate for each one of said flows of information;

a third code that is directed to categorizing each of said plurality of flows of information into one of a plurality of traffic classes;

a fourth code that is directed to measuring a parameter for said each one of said flows of information associated with said one of said plurality of traffic classes;

a fifth code that is directed to applying a time stamp to said parameter to correlate said one of said plurality of traffic classes with a time;

a sixth code that is directed to determining a data rate for each one of said plurality of traffic classes;

a seventh code that is directed to outputting a visual representation of said data rate of at least one of said plurality of traffic classes in graphical form on a display; and an eighth code that is directed to outputting a text representation of said at least one of said plurality of traffic classes on said display; and a ninth code that is directed to applying a traffic policy associated with one or more traffic rules for said each one of said flows of information, and wherein the one or more traffic rules are adapted to be edited and/or created.

23. A method of operating a computer, comprising:

connecting said computer to a wide area network;

connecting said computer to a local area network, said computer serving as a firewall computer for a plurality of flows of information passing between said wide area network and said local area network;

controlling an amount of bandwidth allocated to said flows of information, said control applied by said computer based on one or more traffic rules that are adapted to be edited and/or created; and generating a display by said computer, said display having a chart representing said flows of information passing through said computer, and representing said amount of bandwidth allocated to said flows.

24. A computer-readable medium comprising: instructions and data written thereon said instructions and data containing information for the practice of the method of claim 23.

25. Electromagnetic signals travelling over a computer network comprising: said electromagnetic signals carrying information for the practice of the method of claim 23.

26. A computer comprising:

a first connection to a wide area network;

a second connection to a local area network, said computer serving as a firewall computer for a plurality of flows of information passing between said wide area network and said local area network;

software executing on said computer, said software having,
- a graphical user interface component that generates a display, said display having a chart representing said flows of information passing through said computer, and
- a traffic control and management component that controls and applies an amount of bandwidth allocated to said flows of information, and wherein the traffic control and management component is based on one or more traffic rules that are adapted to be edited and/or created.

27. The computer of claim 26 further comprising:
said software having a component that classifies said plurality of flows of information into parameters, and measures said parameters.

28. The computer of claim 26 further comprising:
said software having a component that allocates bandwidth to said plurality of flows as they pass between said wide area network and said local area network.

29. The computer of claim 26 further comprising:
said software has a component that effectuates a traffic policy by allocating bandwidth to said plurality of flows.

30. The computer of claim 26 further comprising:
said software has an application programming interface (API) component coupled to said graphical user interface and to other components of said software.

31. The computer of claim 26 further comprising:
said graphical user interface displays text as well as said graphical chart.

32. A communication network comprising at least one node according to claim 26.

33. A computer comprising:
a first connection to a wide area network;
a second connection to a local area network, said computer serving as a firewall computer for a plurality of flows of information passing between said wide area network and said local area network;
means for controlling and applying an amount of bandwidth allocated to said flows of information, said control effectuated by said computer, and wherein the means for controlling and applying is based on one, or more traffic rules that are adapted to be edited and/or created; and
means for generating a display by said computer, said display having a chart representing said flows of information passing through said computer, and representing said amount of bandwidth allocated to said flows.

34. A computer comprising:
a first connection to a wide area network;
a second connection to a local area network, said computer serving as a firewall computer for a plurality of flows of information passing between said wide area network and said local area network;
software executing on said computer, said software having, a traffic monitoring and management component to control an amount of bandwidth allocated to said flows of information, wherein the traffic-monitoring and management component uses one or more traffic rules that are adapted to be edited and/or created.

35. The computer of claim 34 further comprising:
a graphical user interface component of said software that generates a display, said display having a chart representing said flows of information passing through said computer.

36. The computer of claim 35 further comprising:
said graphical user interface displays text as well as said graphical chart.

37. The computer of claim 34 further comprising:
said software having a component that classifies said plurality of flows of information into parameters, and measures said parameters.

38. The computer of claim 34 further comprising:
said software having a component that allocates bandwidth to said plurality of flows as they pass between said wide area network and said local area network.

39. The computer of claim 34 further comprising:
said software has a component that effectuates a traffic policy by allocating bandwidth to said plurality of flows.

40. The computer of claim 34 further comprising:
said software has an application programming interface (API) component coupled to a graphical user interface and to other components of said software.

41. A computer comprising:
a first connection to a wide area network;
a second connection to a local area network, said computer serving as a firewall computer for a plurality of flows of information passing between said wide area network and said local area network;
means for monitoring an amount of bandwidth allocated to said flows of information, said monitoring effectuated by said computer; and
means for applying a traffic policy associated with one or more traffic rules, wherein the one or more traffic rules are adapted to be edited and/or created.

42. The computer of claim 41 further comprising:
means for displaying a chart representing said flows of information passing through said computer.

43. A method of operating a computer, comprising:
connecting said computer to a wide area network;
connecting said computer to a local area network, said computer serving as a firewall computer for a plurality of flows of information passing between said wide area network and said local area network;
monitoring an amount of bandwidth allocated to said flows of information; and
applying a traffic policy associated with one or more traffic rules, wherein the one or more rules are adapted to be edited and/or created.

44. The method of claim 43, further comprising:
monitoring said flows to control allocation of bandwidth to said flows.

45. Computer readable media having instructions written therein for the practice of the method of claim 43.

46. Electromagnetic signals propagating on a computer network, said electromagnetic signals carrying information for the practice of the method of claim 43.

47. An apparatus to control traffic flow into a first network of computers from a second network of computers, comprising:
a computer receiving traffic directed to said first network from said second network;
a first application, in response to receiving a packet from said second network for forwarding into said first network, to classify said packet as belonging to a flow, and to measure a current bandwidth used by said flow, referred to as a measured flow bandwidth;

a second application, in response to said measured flow bandwidth, to determine a difference between said measured flow bandwidth and an allocated value of bandwidth for said flow; and a third application, in response to said difference, to manage and apply bandwidth allocation to said flow based on one or more traffic rules that are adapted to be edited and/or created.

48. The apparatus as in claim 47, further comprising:

a process to manage bandwidth of said flow in response to the type of flow.

49. The apparatus as in claim 47, further comprising:

a process to apply an admissions policy to said flow.

50. The apparatus as in claim 47, further comprising:

means for increasing allocated bandwidth if said flow has a high priority.

51. The apparatus as in claim 47, further comprising:

means for decreasing allocated bandwidth if said received packet has a low priority.

52. The apparatus as in claim 47, further comprising:

said first network is a local network and said second network is a remote network.

53. The apparatus as in claim 47, further comprising:

said first network is a remote network and said second network is a local network.

54. The apparatus as in claim 47, further comprising:

a graphical user interface for a person to monitor activity of said computer.

55. The apparatus as in claim 47, further comprising:

a graphical user interface for a person to control operation of said computer.

56. A method for controlling traffic flow into a first network of computers, comprising:

receiving, by a computer, a packet directed to said first network from said second network, said packet addressed for forwarding into said first network;

classifying, in response to receiving said packet, said packet as belonging to a flow, and to measure a current bandwidth used by said flow, referred to as a measured flow bandwidth;

a second application, in response to said measured flow bandwidth, to determine a difference between said measured flow bandwidth and an allocated value of bandwidth for said flow; and a third application, in response to said difference, to manage and apply bandwidth allocation to said flow based on one or more traffic rules that are adapted to be edited/created.

57. The method as in claim 56, further comprising:

adjusting said bandwidth allocation so that said allocation depends upon a type of said flow.

58. The method as in claim 56, further comprising:

applying an admissions policy to incoming flows by adjustment of allocated bandwidth.

59. The method as in claim 56, further comprising:

raising allocated bandwidth if said flow has a high priority.

60. The method as in claim 56, further comprising:

reducing allocated bandwidth if said flow has a low priority.

61. The method as in claim 56, further comprising:

displaying on a graphical user interface data for monitoring operation of said computer.

62. The method as in claim 56, further comprising:

controlling operation of said computer by use of a graphical user interface.

* * * * *

UNITED STATES PATENT AND TRADEMARK OFFICE
CERTIFICATE OF CORRECTION

PATENT NO.    : 6,578,077 B1                                                        Page 1 of 1
DATED         : June 10, 2003
INVENTOR(S)   : Gregory Rakoshitz et al.

It is certified that error appears in the above-identified patent and that said Letters Patent is hereby corrected as shown below:

Column 22,
Lines 37 and 40, delete "1" and insert -- 11 -- therefor.

Signed and Sealed this

Fourteenth Day of October, 2003

JAMES E. ROGAN
*Director of the United States Patent and Trademark Office*